United States Patent
Bebout et al.

(10) Patent No.: US 11,961,033 B2
(45) Date of Patent: Apr. 16, 2024

(54) SYSTEM AND METHOD FOR DYNAMICALLY SCHEDULING API-BASED SHIPMENT UPDATES ACROSS CARRIERS

(71) Applicant: CONVEY, LLC, Austin, TX (US)

(72) Inventors: Jennifer Lynn Bebout, Austin, TX (US); Clinton Frederick Miller, Austin, TX (US); Olivier Jean Marie Modica, Austin, TX (US); Sebastian Kuruvilla Karivelithara, Austin, TX (US)

(73) Assignee: CONVEY, LLC, Austin, TX (US)

( * ) Notice: Subject to any disclaimer, the term of this patent is extended or adjusted under 35 U.S.C. 154(b) by 1077 days.

(21) Appl. No.: 16/241,495

(22) Filed: Jan. 7, 2019

(65) Prior Publication Data

US 2019/0213538 A1 Jul. 11, 2019

Related U.S. Application Data

(60) Provisional application No. 62/614,186, filed on Jan. 5, 2018.

(51) Int. Cl.
*G06Q 10/0833* (2023.01)
*G06Q 10/0835* (2023.01)

(52) U.S. Cl.
CPC ..... *G06Q 10/0833* (2013.01); *G06Q 10/0835* (2013.01)

(58) Field of Classification Search
None
See application file for complete search history.

(56) References Cited

U.S. PATENT DOCUMENTS 6,859,787 B2 * 2/2005 Fisher ............ G06Q 10/063114
705/26.81
7,752,142 B2 * 7/2010 Bjerre ................ G06Q 10/0834
705/333

(Continued)

FOREIGN PATENT DOCUMENTS

CN 101754148 A * 6/2010

OTHER PUBLICATIONS

Maria Fagerland, [Sharing] Solving the Multi-Carrier Integration Challenge, Apr. 5, 2017 Shipworks, pp. 1-2,https://www.shipworks.com/blog/sharing-solving-the-multi-carrier-integration-challenge/ (accessed Jan. 25, 2022) (Year: 2017).*

(Continued)

*Primary Examiner* — Resha Desai
*Assistant Examiner* — Ismail A Manejwala
(74) *Attorney, Agent, or Firm* — MARSHALL, GERSTEIN & BORUN LLP

(57) ABSTRACT

A shipping management system comprising a memory configured with shipping records representing shipments from a plurality of carriers and scheduling rules that specify a plurality of update frequencies. The shipping management system comprises a processor coupled to the memory. The shipping management system comprises a non-transitory computer readable medium comprising a set of computer executable instructions, the computer executable instructions executable by the processor to dynamically schedule, according to the scheduling rules, updates to update the shipping records; based on the dynamic scheduling, issue update application programming interface (API) calls according to APIs of carrier systems of respective carriers to request shipment data for the shipments; and update the shipping records based on the shipment data returned in response to the API calls.

18 Claims, 10 Drawing Sheets

(56) References Cited

U.S. PATENT DOCUMENTS

| | | | | |
|---|---|---|---|---|
| 8,681,630 | B1* | 3/2014 | Gibson | H04L 67/62 |
| | | | | 370/235 |
| 9,832,268 | B2* | 11/2017 | Mehra | H04L 67/1091 |
| 10,262,281 | B1* | 4/2019 | Vitek | G06Q 10/0639 |
| 10,915,870 | B2* | 2/2021 | Gillen | G06Q 10/1097 |
| 11,107,029 | B1* | 8/2021 | Henry | G06F 9/4881 |
| 2007/0162421 | A1* | 7/2007 | Pang | G06F 16/252 |
| 2008/0004995 | A1* | 1/2008 | Klingenberg | G06Q 10/083 |
| | | | | 705/28 |
| 2010/0138355 | A1* | 6/2010 | Kodger, Jr. | G06Q 10/025 |
| | | | | 705/333 |
| 2015/0229579 | A1* | 8/2015 | Kosim-Satyaputra | |
| | | | | H04L 67/01 |
| | | | | 709/225 |
| 2018/0240066 | A1* | 8/2018 | Streebin | G06Q 10/0832 |
| 2019/0012639 | A1* | 1/2019 | Boothman | G06Q 10/0838 |
| 2021/0319398 | A1* | 10/2021 | Streebin | G06Q 10/0833 |

OTHER PUBLICATIONS

Olaf Zimmermann, Interface Representation Patterns—Crafting and Consuming Message-Based Remote APIs, Jul. 12, 2017, European Conference on Pattern Languages of Programs (Year: 2017).*

* cited by examiner

| ID | STATUS | CARRIER NAME | TRACKING NUMBER | EXCEPTION TYPE | ORIGIN | DESTINATION | RECIPIENT NOTIFICATION | SCHEDULE |
|---|---|---|---|---|---|---|---|---|
| 1000 | IN_TRANSIT | ACME FREIGHT | 596984318 | NULL | DALLAS, TX | AUSTIN, TX | SMS | 2018-18-23T07:40 |
| 1001 | IN_TRANSIT | PARCEL EXPRESS | 1Q120303 | DAMAGED_OR_SHORTED | SAN FRANSICO, CA | LOS ANGLES, CA | SMS | 2018-12-23T08:15 |

FIG. 2

| ID | SHIPMENT_ID | STATUS | EXCEPTION_TYPE | CREATED_DATETIME |
|---|---|---|---|---|
| 2001 | 1000 | SCHEDULED | NULL | 2018-18-20T1:13 |
| 2002 | 1000 | IN_TRANSIT | HELD_AT_TERMINAL | 2018-12-21T13:05 |
| 2003 | 1000 | IN_TRANSIT | NULL | 2017-12-23T06:40 |

FIG. 3

Shipper X

All Shipments

Status ✕
In Transit

| Mode ▶ | Created Date ▶ | More Filters ▶ | | Search: | | |

| Tracking # | Identifiers | Carrier | Origin | Ship Date | Status | Exception Type | Estimated Delivery |
|---|---|---|---|---|---|---|---|
| 596984318 | 110049375 BOL 3313877112 PO | Acme Freight | 75202 | 12/21/18 | In_Transit | | 1/10/19 |
| 596984433 | 110049390 BOL 6163859177 PO | Acme Freight | 75202 | 12/20/18 | In_Transit | | 12/26/18 |
| 596984400 | 110049071 BOL 524859477 PO | Acme Freight | 75202 | 12/20/18 | In_Transit | | 12/27/18 |
| 596984398 | 11005000 BOL 21118M4 PO | Acme Freight | 75202 | 12/20/18 | In_Transit | | 12/27/18 |
| 596983800 | 110049200 BOL 6163859177 PO | | 94105 | 12/19/18 | In_Transit | Shorted_or_ Damaged | 12/27/18 |
| 1Q120407 | | Parcel Express | 75202 | 12/19/18 | In_Transit | | 1/08/19 |
| 2843211 | 82128463 BOL | ABC Group | 75202 | 12/18/18 | In_Transit | | 12/26/18 |
| 1Q120303 | | Parcel Express | 75202 | 12/18/18 | In_Transit | | 01/03/19 |
| 2843100 | 82128163 BOL | ABC Group | 75202 | 12/18/18 | In_Transit | | 12/10/19 |
| 2843090 | 82128085 BOL | ABC Group | 75202 | 12/17/18 | In_Transit | | 01/02/19 |

Rows Per Page 10 ▼    151-160 of 58,228    |< < 14 15 [16] 17 18 > >|

SYSTEM AND METHOD FOR DYNAMICALLY SCHEDULING API-BASED SHIPMENT UPDATES ACROSS CARRIERS

RELATED APPLICATIONS

This application claims the benefit of priority under 35 U.S.C. § 119(e) to U.S. Provisional Patent Application No. 62/614,186, entitled "System and Method for Dynamically Scheduling API-BASED Shipment Updates Across Carriers," filed Jan. 5, 2018, which is hereby fully incorporated herein for all purposes.

TECHNICAL FIELD

The present disclosure relates generally to computer systems for shipping management. More particularly, the present disclosure relates to shipping management computer systems that dynamically schedule API-based shipment updates.

BACKGROUND

The shipment of goods between shippers, such as retailers, and recipients is typically executed by carriers that own assets (trucks, cars, cargo ships, airplanes, rail cars) and that are contracted by manufacturers and retailers of those goods. In general, shipments are divided into two modes: "parcel" and "freight." Parcels are generally small, individual shipments handled by common carriers. Individual shippers can drop off these shipments at numerous locations (or have the shipments picked up) at their convenience. A shipment that exceeds the parcel limits is typically categorized as freight. Freight may be further divided into freight modes such as Full Truckload (FTL), Partial Truckload, Less Than Truckload (LTL), Air Freight, Ocean Freight, Rail Freight and Intermodal Freight.

Many carriers provide online systems to allow shippers to schedule shipments and to provide shippers or intended recipients with in-transit tracking data that identifies when goods have passed through various designated tracking locations along the route. For smaller shippers that use multiple carriers, the shipper must independently interact with multiple carrier systems to schedule shipments and assess the status of shipments across carriers. To provide in-transit tracking data to intended recipients, such shippers may have to link to or otherwise direct intended recipients to the carrier-specific online systems.

In some cases, carriers provide public application program interfaces (APIs) that a shipping management system can use to request shipment status data. Shipping management systems encounter a number of problems when using such APIs to track shipments. First, some carriers track shipments using multiple mechanisms and some shipment related data may not be available via the carrier's API, resulting in incomplete data at the shipping management system. Furthermore, shipping management systems call the carrier status APIs on a fixed schedule. First, if the API call schedule is very frequent (for example, every 15 minutes, every 5 minutes, every 1 minute, etc.) then carrier API call rate limits are quickly be exceeded, which can lead to some calls being unanswered and lead to stale data. Second, if the API call schedule is not very frequent (for example, every day at 4 AM, etc.) then data can also become stale. Stale data can result in late notifications to shippers and/or end recipients regarding the status of a shipment.

SUMMARY

One embodiment is directed to a shipping management system that dynamically schedules API calls. According to one embodiment, the shipping management system comprises a memory configured with shipping records representing shipments from a plurality of carriers and scheduling rules that specify a plurality of update frequencies. The shipping management system comprises a processor coupled to the memory. The shipping management system comprises a non-transitory computer readable medium comprising a set of computer executable instructions, the computer executable instructions executable by the processor to dynamically schedule, according to the scheduling rules, updates to update the shipping records; based on the dynamic scheduling, issue update application programming interface (API) calls according to APIs of carrier systems of respective carriers to request shipment data for the shipments; and update the shipping records based on the shipment data returned in response to the API calls. According to one embodiment, the scheduling rules are configured to limit the API calls to within respective rate limits of the APIs.

According to one embodiment, the shipping management system is configured to access a shipping record representing a shipment by a respective carrier and determine a last update time for the shipping record and next scheduled update time for the shipping record. Based on a determination that the last update time for the shipping record is after the next scheduled update time for the shipping record, the shipping management system can match the shipping record to a carrier specific scheduling rule for the respective carrier and update the next scheduled update time for the shipping record based on the scheduling rule.

Based on a determination that the current time is after the next scheduled update time, the shipping management system can create a task to update the shipping record, generate an API call to a carrier system of the respective carrier to request a status update for the shipping record and update the shipping record based on shipment information returned in the response to the API call.

Another embodiment comprises a computer program product comprising a non-transitory computer readable medium storing a set of computer executable instructions, the computer executable instructions executable by the processor to dynamically schedule, according to a set of scheduling rules, updates to update shipping records representing shipments by multiple carriers; based on the dynamic scheduling, issue update application programming interface (API) calls according to APIs of carrier systems of respective carriers to request shipment data for the shipments; and update the shipping records based on the shipment data returned in response to the API calls.

The computer executable instructions can be executable to access a shipping record representing a shipment by a respective carrier, determine a last update time for the shipping record and next scheduled update time for the shipping record. Based on a determination that the last update time for the shipping record is after the next scheduled update time for the shipping record: the shipping record can be matched to a carrier specific scheduling rule for the respective carrier and the next scheduled update time for the shipping record updated based on the scheduling rule.

Based on a determination that the current time is after the next scheduled update time a task can be created to update the shipping record and an API call generated to a carrier system of the respective carrier to request a status update for the shipping record. The shipping record can be updated based on shipment information returned in the response to the API call.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2 is a diagrammatic representation of one embodiment of a set of shipping records;

FIG. 3 is a diagrammatic representation of one embodiment of a set of event records;

FIG. 9 is a diagrammatic representation of one embodiment of an operator interface providing a unified view;

FIG. 10 is a diagrammatic representation of one embodiment of an operator interface providing additional detail;

DETAILED DESCRIPTION

Figure 1:
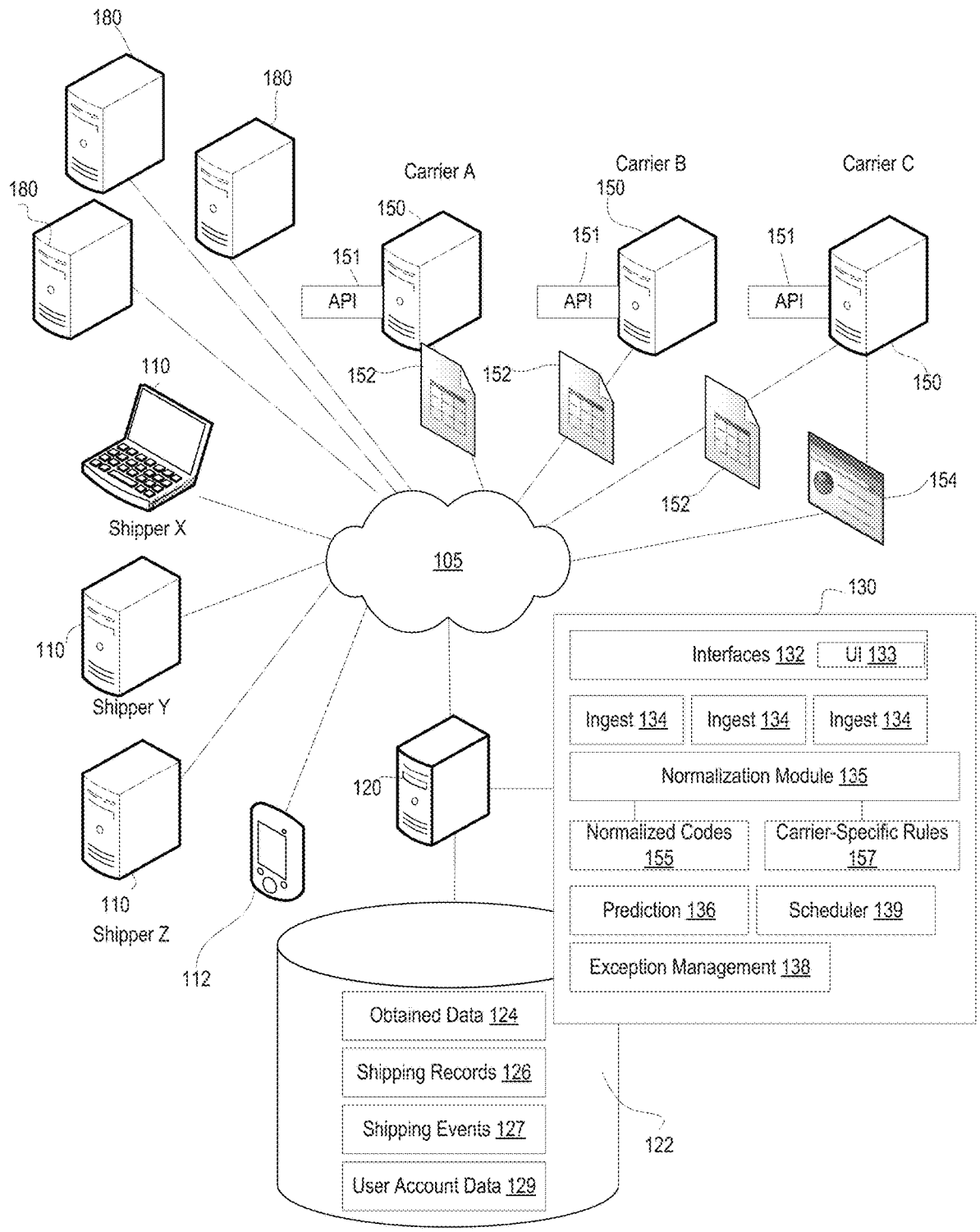
FIG. 1 is a diagrammatic representation of one embodiment of a topology that includes a shipping management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

This disclosure is directed to shipping management systems and methods. One particular embodiment is directed to a shipping management system having a computer system coupled to a network and a data storage device. The shipping management system uses one or more ingest modules to collect shipping and tracking information from multiple carriers. The shipping management system gathers carrier data by integrating with a Web service API using a service client to perform a request providing shipment information, such as a tracking number or reference number, to the service and processing the response from the service. The shipping management system uses mechanisms to dynamically control the rate at which updates are requested from carriers.

The systems, methods, and products include one or more dashboards (for example, a web-based dashboard generated by an interface module) accessible by a user that is associated with an account holder. From the dashboard, the user can view various metrics and access functions of a shipping system, such as scheduling shipments. In some embodiments, a user can click on exceptions and/or tracking menu items to see information for all shipments associated with the account holder or information for all shipments that have exceptions or tracking information. Numerous other embodiments are also possible.

Carriers have different ways to describe shipping status (e.g., tracking) information and shipment problem (e.g., exception) information. The system described provides a model for shipping status and shipping exceptions that considers many modes (parcel, LTL, white glove, etc.) and scenarios across the shipping landscapes. A shipping management system according to the present disclosure can include mechanisms to collect data from carriers "as is" and bring that into the system. The system can include mechanisms to map and transform the "as is" carrier data into a normalized model. The system provides a user interface to view and search data in the model to get shipment status, to gain insight, and to take action on problematic shipments.

The shipping management system is configured to call status APIs at the right time—more frequently when shipments are in certain states, and less frequently when they are in other states. According to one embodiment, the shipping management system uses a combination of rules and signals that matches each individual shipment with its own update schedule to maximize the freshness of data, respect carrier API call rate limits and optimize the use of computer and network resources. The system described uses mechanisms to increase or decrease dynamically the rate at which updates are requested from carriers based on interest signals such as whether a shipment has any alert subscription or whether users have viewed the shipment details. The system described uses mechanisms to increase or decrease dynamically the rate at which updates are requested based on API call rate limits rules for each carrier based on the carriers' requirements and capabilities. The system described uses mechanisms to update shipment-specific and carrier-specific rules while shipments are active in the system. In some embodiments, decisions are made on how frequently the status of shipments are checked based on information about the shipment, such as how close the shipment is supposed to be to delivery. The system uses various mechanisms to determine when to request the status of a shipment, which allows the system to throttle how often it requests status updates (e.g., via API requests) from carriers.

There are many advantages to a system for dynamically scheduling API-based shipment updates across carriers that are enabled by the system described in this disclosure. For example, one advantage of the system is that data is fresh for decision making and taking action, while carrier API request rate limits are respected and users of the system are considered a good API "citizen" by the carriers. Also, fresh data results in significantly improved decision making. With respect to notifications, for example SMS text notifications that are sent by the system when a shipment is delivered, the notifications happen promptly when the event occurs (e.g., the delivery of a shipment). Also, users of the system know that the data in the system is fresh, and therefore can take action with confidence.

Embodiments of the systems and methods of the present invention may be better explained with reference to FIG. 1, which depicts one embodiment of a topology, which may be used to implement certain embodiments. The topology comprises a data processing system 120 (referred to as shipping management system 120) bi-directionally coupled to shipper computing systems 110, recipient computer systems 112 and carrier computer systems ("carrier systems") 150 through network 105. Shipping management system 120 may also connect to various other external systems 180, such as e-commerce servers, ERP systems, TMS systems, ESP/SMS systems, CSR/CRM systems. According to one embodiment, shipping management system 120 may provide a cloud-based system or other network accessible system that multiple shippers can use to manage and track shipments across multiple carriers. Network 105 may be for example, a wireless or wireline communication network such as the Internet or wide area network (WAN), publicly switched telephone network (PTSN) or any other type of electronic communication link.

Shipping management system 120 may comprise one or more computer systems with central processing units executing instructions embodied on one or more computer readable media where the instructions are configured to perform at least some of the functionality associated with embodiments of the present invention. These applications may include a shipping management application 130 comprising one or more applications (instructions embodied on a computer readable media) configured to implement interfaces 132, data ingest modules 134, a normalization module 135, prediction module 136, an exception management module 138 and a scheduler module 139 utilized by the shipping management system 120.

Furthermore, shipping management system 120 may include data store 122 operable to store obtained data 124 collected from carrier systems 150, shipping records 126, shipping event records 127, user account data 129 and other data. User account data 129 can include account information for holders of accounts with shipping management system 120 (e.g., profile data for account holders). The account holder may an individual, shipper or an entity, such as a retailer, that uses drop shippers, where the drop shippers may or may not be account holders.

Shipping records 126 can hold information about individual shipments. One example of a set of shipping records is illustrated in FIG. 2. In FIG. 2, each row represents a shipping record. While only two shipping records are illustrated, shipping management system 120 may maintain many thousands or millions of shipping records. In the example shown, each shipment has an internal shipment id (column 202) that the shipping management system 120 uses to identify the shipment. Column 206 identifies the carrier for each respective record. Each shipment record can include a variety of information provided by a shipper (e.g., via an interface 133) or a carrier system 150, such as a tracking number (column 204), origin (column 208), destination (column 210), whether the intended recipient requested notifications for the shipment (column 212). A shipping record may also include shipment tracking information, such as a most recent status (column 220) and an exception (column 222) and scheduling information (column 224). In general, the most recent status and exception for a shipment may be stored in the shipping record for the shipment. Some data in a shipping record may be normalized data.

A shipping record will typically include more information than is shown in FIG. 2, which, for clarity, shows just a few exemplary fields. A shipping record may include, for example, the recipient name, address and other information. A shipping record may also include other information provided by the carrier or shipper for shipments including, for example estimated delivery dates, purchase order (PO) numbers, bill-of-lading (BOL) numbers or other information. In one embodiment, for example, the shipper may provide to the shipping management system data that includes the purchase order PO numbers for shipments. In other cases, the shipper may push this information to the carrier and the shipping management system can receive it from the respective carrier system (e.g., in a shipment record file or in response to an API call).

Further, shipping records can be associated with specific account holders (e.g., shippers or other entities) of the shipping management system 120. For example, data store 122 may store account holder records for each account holder that indicate the shipments associated with that account holder. In another embodiment, a shipping record may indicate the account holder with which it is associated. Thus, a particular user will only be able to access the shipping records associated with the account holder for which the user has access.

Event records 127 can hold information related to events for a particular shipment. FIG. 3 illustrates one embodiment of example event records 127 for the shipment having SHIPMENT_ID 1000. Each row represents an event record. While only three event records are illustrated, the shipping management system 120 can maintain any number of event records for each shipment. In the example shown, each shipment event has an internal id (column 230) and an indication of the shipment with which the event is associated (column 232). Shipping event records may store shipment tracking information, such as statuses (column 234) and exceptions (column 236) over the life of a shipment. As discussed below, exceptions may include normalized exceptions determined from status information provided by a carrier or predicted exceptions generated by shipping management system 120. Further, a shipping event record may include the time and date at which an event was created (column 238). The time and date values can be used to determine the order in which the events occurred, since they may not all be received in order.

The shipment event records of FIG. 3 are provided by way of example and shipment event records can store additional or alternative data. For example, a shipment event record may specify a location associated with an event.

Continuing with FIG. 1, the user account data 129 may include carrier credentials where the carrier credentials include information necessary to retrieve shipment data for the account holder from one or more carrier systems 150. The carrier credentials for an account holder/carrier pair (e.g., a shipper/carrier pair) may include a customer number, username and password, secret key, token or other information so that management system 120 may request shipment data. For example, the account information for Shipper X may include information to log in and request shipment data for Shipper X from Carrier A's system 150, information to log in and request shipment data for Shipper X from Carrier B's system 150, and information to log in and request shipment data for Shipper X from Carrier C's system 150. The carrier credentials may also include information so that shipping management system 120 can log into a carrier system 150 on behalf of the account holders to schedule a pick up or perform other operations. The carrier credential information may be provided as part of onboarding a shipper or other account holder.

Shipping management system 120 utilizes interfaces 132 configured to, for example, receive and respond to queries from users at shipper computer systems 110 or recipient computer systems 112, interface with carrier computer systems 150, and interface with other external systems 180, obtain data from or provide data obtained, or determined, by shipping management system 120 to any of shipper computer systems 110, recipient computer systems 112, carrier computer systems 150 and other external system 180. It will be understood that the particular interface 132 utilized in a given context may depend on the functionality being implemented by shipping management system 120, the type of network 105 utilized to communicate with any particular entity, the type of data to be obtained or presented, the time interval at which data is obtained from the entities, the types of systems utilized at the various entities, etc. In some embodiments, these interfaces may include, for example web pages, web services or application programming interfaces (APIs). In particular, in some embodiments, shipping management system 120 can provide an API so that online ordering systems may be integrated with shipping management system 120.

According to one embodiment, shipping management system 120 may provide a user interface (UI) 133 to provide shippers with unified views of shipment data related to the shippers. The UI 133 may comprise web pages, mobile application pages or other pages or data to provide a unified view.

According to one embodiment, shipping management system 120 may provide an interface 132 through which a user can define a shipment. An ingest module 134 may be configured to receive and process order-level information from shippers in the form of data files exchange or Web Service API integration and relevant shipment data. The shipment data may include an indication of an account holder if different than the shipper (e.g., a drop shipper can indicate (or it may be implicit) that the shipment is on behalf of a particular retailer), recipient contact information (e.g., name, phone number, email address), from address (shipper), to address (consignee), weight, product class and dimensions, whether the intended recipient has requested notifications regarding the shipment and other information.

Shipping management system 120 may provide carrier selections to the user so that the user may select a final shipper or shipping management system 120 may automatically select the carrier. According to one embodiment, shipping management system 120 may apply rules to a combination of signals (e.g., transportation signals, historical signals, business signals) to determine the carriers from which a user may select or to automatically select a carrier as described in U.S. patent application Ser. No. 15/836,374, filed Dec. 8, 2017, entitled "SHIPPING MANAGEMENT SYSTEM WITH MULTI-CARRIER SUPPORT", which is hereby fully incorporated by reference for all purposes.

Shipping management system 120 may then interact with the carrier system 150 for the selected carrier to execute the shipment. In some cases, carrier systems 150 may provide a public APIs 151 that allow external systems to execute shipments and access tracking data and shipping management system 120 may use the API to execute the shipment.

In other cases, a shipper can initiate a shipment directly with a carrier and provide the shipment data to the carrier without going through shipping management system 120. The shipper can provide a tracking number or other shipment identifier to shipping management system 120 and other shipment information (e.g., whether an intended recipient should receive notifications and the contact information for the intended recipient) via interface 133 so that shipping management system 120 can request the appropriate shipment information from the carrier system 150. In other embodiments, shipping management system 120 can discover shipments associated with an account holder from information provided by a carrier system 150 and obtain shipment information from the carrier system 150.

During shipment, carrier systems 150 provide shipment tracking data that indicates the status of shipments (e.g., when a shipment was ready for pickup, when the shipment was picked up, check in/check out at various tracking locations, when the shipment was actually delivered and other information). Each tracking update can contain one or more of status (status code or other description), location and time information for a shipment. In some cases, a tracking update may indicate an exception (event that delays or otherwise adversely affect a shipment). Exception data may include for example, data that indicates that a pickup was missed, a shipment was delivered late, a shipment was damaged, etc.

Carrier systems 150 may provide shipment-specific data, including shipment tracking data through a variety of mechanisms. Data sources for shipment specific data include, but are not limited to, shipment report files (e.g., spreadsheets, comma-separated files, other structured files, etc.), public APIs provided the carriers, data scraped from web sites, data manually received from carriers, data pushed from a carrier, etc. For a given carrier, data may be acquired in multiple ways and integrated together to provide a combined view of the data compared to getting data from a single source.

When integrating shipping management system 120 with a carrier system 150, a "discovery process" occurs to make a determination of what combination of data sources will give the best overall information. This discovery process could take the form of research, manually consulting with the carrier, etc. Ingest modules 134 can then be configured to gather shipment specific data from that carrier. For a given carrier, data may be acquired from multiple sources and integrated together.

Some carrier systems 150 implement a document interchange mechanism that allows users to register to receive shipment report files 152 formatted according to a defined specification. The document interchange may be performed using a standardized electronic data interchange (EDI) format or a proprietary format. In another embodiment, the document interchange may involve a carrier system 150 sending shipment report files 152 as email attachments to an email address accessible by shipping management system 120 or uploading to an FTP site or other network location accessible by shipping management system 120.

The shipment report files 152 provided by a carrier system 150 can be formatted according a specification known to both the carrier and the implementer of shipping management system 120. For example, the shipment report files 152 may be a comma-separated value file or spreadsheet in which the columns adhere to a defined specification. An ingest module 134 may be configured to request, receive and or access shipment report files from a carrier and process the shipment report files according to the defined format to extract shipment data.

Shipment report files have a variety of degrees of information, depending on the carrier. For some carriers, the shipment report files merely indicate the existence of shipments (e.g., simply provide a list of shipment numbers for shipper). In other cases, the shipment report files include additional shipment information including, in some cases, shipment status information.

Some carrier systems 150 provide public APIs 151 that allow external systems to access tracking data. An ingest module 134 may be programmed to make calls to the API 151 of a carrier system 150 to collect tracking data related to shipments by that carrier. As a more particular example, an ingest module 134 can be configured to integrate with a Web Service API using a service client to perform a request with shipment data, such as a tracking number or reference number, to the web service and process the response from the service. As is discussed below, carriers typically limit the number of API calls that are allowed over a given time period for a given shipment for a given requestor.

Some carriers provide shipment-specific information using both shipment report files and API-based shipment data such that the information from periodic shipment report files can be augmented using tracking updates collected via the API 151. A carrier system 150, for example, may be configured to provide periodic shipment report files (e.g., every few minutes, every several hours or other period) on a per-shipper basis and provide additional shipment-specific information via an API 151. For example, Carrier A's system 150 may periodically provide a shipment report file for Shipper X, a shipment report file for Shipper Y and a shipment report file for Shipper Z and also provide shipment status updates via the respective API 151.

Shipping management system 120 may thus include an ingest module 134 configured to receive shipment report files from a carrier system 150 and an ingest module 134 configured to poll the carrier system's API 151 for updates. For example, shipping management system 120 may include a first ingest module 134 configured to process shipment report files from Carrier A to extract shipments associated with a shipper and a second ingest module 134 to poll the API 151 provided by Carrier A to update shipment status information.

Other carrier systems 150 may provide tracking data through a web page interface, such as web page 154. However, since the structure of a web page can be understood through observation, an ingest module 134 may be programmed to provide shipment information to a web site, download the HTML content from the carrier tracking web page and extract the relevant tracking information using rules to identify the tracking data on the page. Ingest modules 134 may also be programmed to collect tracking data through other mechanisms.

It can be noted that shipping management system 120 may receive, via interaction with carrier systems 150, shipment data on shipments regardless of whether the shipments were executed through shipping management system 120. Thus, shipping management system 120 can discover shipments not initiated through shipping management system 120 and unify shipment-specific data for shipments initiated through various channels and across carriers.

Ingest modules 134 may use a set of scheduling rules to schedule how often tracking data is requested from the different sources, unless the update frequency is controlled by the carrier as may be the case when receiving shipment reports via email attachments. The scheduling rules can take into consideration the current status of the shipment, the type of shipment, the expected delivery date, the carrier, whether a person or system is subscribed for updates (e.g., SMS text notifications of updates) or other factors.

The collected data may include, among other information, both temporal ("when") and location ("where") information that is used to build a full context of each tracking update. Each tracking update can contain one or more of status (status code or description), exception, location and time information for a shipment. The exception information will either be extracted as-is (if the carrier provides such information) or will be computed through status mapping using carrier-specific rules. In some embodiments, the system can intelligently fill in gaps in the collected information by leveraging known information about the shipment, such as origin and destination information. For example, if the location information for a "delivered" tracking update is not available, the shipment destination information can be used to fill in that information.

When processing shipment-specific information, shipping management system can identify if the shipment is a new shipment (a shipment for which there is no shipping record 126) or an existing shipment. If the shipment is a new a shipment, shipping management system 120 can create a shipping record 126. In general, shipments can be identified as new or existing shipments because carriers assign each shipment a unique shipment or tracking number. In some cases, when a shipment record is created, it only includes a limited set of shipment information. Additional information may be obtained from the respective carrier system 150. Additionally, the shipment record may be augmented with status, exception and scheduling information.

Normalization module 135 is configured to map between the carrier specific formats used by each carrier system 150 and normalized data. In accordance with one embodiment, normalization module 135 includes normalization rules (e.g., carrier-specific status mappings 157) to map the carrier tracking codes in the received carrier data to (internal) normalized tracking codes 155, examples of which are discussed below.

According to one embodiment, normalization module 135 processes carrier-specific status mappings 157 that map specific status code values or status description values or both to one of a number of normalized statuses along with an exception category when appropriate. In general, the statuses correspond to various stages of a shipment (e.g., pickup scheduled, picked up, in-transit, available for pick up, out for delivery, delivered).

In one embodiment, shipping management system 120 defines a status mapping document (e.g., in JavaScript Object Notation (JSON) format or other format) which defines:

An input status code and/or status description.

A matching rule, which is either "matches exactly", "starts with", "ends with" or regular-expression based, that is applied to the input status code or status description. In some embodiments, applying matching rules may include parsing carrier provided transit data for specific codes or descriptive words (e.g., "arrived").

A resulting normalized status code and exception type for each matching input.

By defining a carrier-specific status mapping, shipping management system 120 can compensate for differences between carriers using more or less specific rules based on the granularity for the source data.

In the example where shipping management system 120 defines a status mapping document in JSON format, the JSON document can be used to define rules per carrier and per status code and/or status description. The general structure of an exemplary JSON document is as follows:

1. Carrier
    1.1 Status code
        If status pattern matches then set status and exception type, if appropriate.
        Status pattern is match exactly, starts-with, ends-with or regular-expression match.
    1.2 Status description
        If status description pattern matches then set status and exception type, if appropriate.
        Status pattern is match exactly, starts-with or ends-with.

Essentially, the JSON document provides a tree of decisions, starting with determining the carrier, since the rules are carrier-based. Next, a matching rule determines if the status pattern matches a status code value. In some examples, the status pattern could match a status code exactly. In other examples, the status pattern does not match exactly, but the status pattern "starts with", "ends with", etc. a value. If the rules do not match a status code, the system can map a fallback value, such as "in transit". Other examples are also possible.

Following is an example of a rules JSON document that can be used to define rules per carrier and per status code and/or status description:

```
"CARRIER_A": {
  "STATUS_VALUE": {
    "type": "SINGLE",
    "state": {
      "status": "IN_TRANSIT",
      "exception_type": "ATTEMPTED_DELIVERY"
    }
  }
}
```

As described above, normalization module 135 is configured to map between the carrier specific formats used by each carrier system and internal normalized tracking codes 155. Examples of normalized status codes include, but are not limited to: "SCHEDULED", "IN_TRANSIT", "APPOINTMENT", "OUT_FOR_DELIVERY", "DELIVERED", "CANCELED". Table 1 provides an example of normalized codes to which the normalization module 135 maps. The example shown in Table 1 shows shipping status information from multiple carriers (Carrier A, Carrier B, Carrier C) being mapped to normalized shipping status codes. As shown, Column 1 of Table 1 identifies the carrier for each shipment. Column 2 of Table 1 shows shipping status code provided by the respective carrier. As described above, shipping status codes from different carriers are not standardized. Column 3 of Table 1 shows the normalized shipping status.

TABLE 1

| CARRIER | CARRIER STATUS CODE | NORMALIZED STATUS |
|---|---|---|
| CARRIER A | AWDEL | IN_TRANSIT |
| CARRIER A | PDEL | DELIVERED |
| CARRIER B | ON-HAND AT DESTINATION | IN_TRANSIT |
| CARRIER B | DELIVERED | DELIVERED |
| CARRIER C | SE | IN_TRANSIT |
| CARRIER C | OD | OUT_FOR_DELIVERY |

As shown in Table 1, each carrier uses internal codes to indicate the status of a shipment. Since different carriers use different codes for similar status information, it is difficult for end users to analyze and compare shipment information across multiple carriers. However, once the status codes are mapped and normalized by the normalization module (column 3 of Table 1) a user can easily analyze and compare shipment information across multiple carriers. For example, as shown in Table 1, rows 2 and 4 show a status of "DELIVERED" by Carrier A and Carrier B, despite each carrier using different internal status codes (e.g., see Column 2, "PDEL" and "DELIVERED").

The normalization module can also map carrier specific exceptions to normalized exception codes. Some carriers indicate exceptions using status codes for the exceptions while others indicate an exception through a flag or a description associated with another status code. In any case, the carrier-specific exceptions can be mapped to normalized exceptions. Table 2 is an example of a set of exceptions to which carrier-specific exceptions may be mapped:

TABLE 2

| Exception Type | Description |
|---|---|
| attempted_delivery | Attempted delivery. |
| available_for_pickup | Available for pickup by recipient at carrier terminal or access location. |
| consignee_refused | Consignee refused shipment. |
| customer_change_request | Customer change requested. May include a future delivery, hold or service level change. |
| damaged_or_shorted | Shipment damaged. |
| general_delay | General delay. |
| held_at_terminal | Shipment held at terminal waiting for additional delivery instructions. |
| incorrect_address | Incorrect address or contact information. |
| no_attempt_made_scheduled_next_day | Scheduled for next day. |
| reconsigned | A change was made to the recipient's delivery address. |
| remote_address | An area that is difficult to access, therefore the carrier may deliver there less frequently. |
| return_to_sender | Shipment returned to sender. |
| schedule_appointment | Cannot schedule delivery. |
| shipment_correction | Shipment correction. Weight, dimensions and classifications are typical rating attributes corrected that result in higher or lower shipping costs. |
| shipment_label_replaced | Shipping label replaced. |
| tendered_late | Tendered late. |
| unable_to_track | Carrier unable to track shipment. |
| weather_delay | Weather delay. |

Table 3 is an example showing exception information from multiple carriers (Carrier A, Carrier B, Carrier C) being mapped to normalized exception codes. As shown, Column 1 of Table 3 identifies the carrier for each transaction. Column 2 of Table 3 shows an exception status code or description provided by the carrier. As described above, status codes from different shippers are not standardized. Column 3 of Table 3 shows a sample of the normalized exception status.

TABLE 3

| CARRIER | STATUS CODE/EXCEPTION | EXCEPTION |
| --- | --- | --- |
| Carrier A | Your shipment has been delayed. Please contact the destination service center | held_at_terminal |
| Carrier B | PODP | damaged_or_shorted |
| Carrier C | Refused | consignee_refused |

FIG. 2 illustrates, for example, shipment records for multiple carriers having normalized status codes. In addition, record 1001 includes a normalized exception.

As shipment tracking events are processed, event records can be created for the shipment. FIG. 3, for example, illustrates an example set of event records for SHIPMENT_ID:1000. In this case, the shipment having SHIPMENT_ID:1000 has three event records. Each event record includes a normalized status code and, in some cases, an exception. The most recent status and exception for a shipment can be included in the shipping record for the shipment as illustrated in FIG. 2.

In addition to normalized exception flags determined from the carrier specific status codes, shipping management system may generate predicted exceptions. Returning to FIG. 1, prediction module 136 may be programmed with rules to identify potential exceptions (also referred to as a "predicted exceptions" herein). Examples of predicted exceptions include, but are not limited to, the predicted exceptions illustrated in Table 4.

TABLE 4

| Predicted Exception | Description |
| --- | --- |
| convey_missed_estimated_delivery_date | Carrier missed carrier's original estimated delivery date. |
| convey_missed_pickup | Carrier missed pickup warning. |
| convey_predicted_delay | Delay warning. |

If a predicted exception is determined for SHIPMENT_ID:1000 of FIG. 2, the predicted exception can be added as an event to the shipment events for SHIPMENT_ID:1000 in FIG. 3. The shipping record for SHIPMENT_ID:1000 may also be updated to reflect the predicted exception as the most recent exception.

For example, a rule may specify that if a shipment is marked as "SCHEDULED" (pickup has been scheduled), but no action has occurred on a shipment for "x" number of hours, the shipment can be flagged as having a potential exception. For example, a rule can specify that if a shipment is scheduled but is not in transit within 12 hours of the ship date, then a missed pickup exception can be set (e.g., an event with "convey_missed_pickup" from Table 1 can be added to the event records for the shipment and the shipping record updated). In another example, if a shipment is not delivered and the estimated delivery date has passed then, then a missed estimated delivery date can be set (e.g., "convey_missed_estimated_delivery_date" from Table 6). According to one embodiment, predictive exceptions may be determined as described in U.S. patent application Ser. No. 15/836,354 filed Dec. 8, 2017, entitled "SYSTEMS AND METHODS FOR PREDICTIVE IN-TRANSIT SHIPMENT DELIVERY EXCEPTION NOTIFICATION AND AUTOMATED RESOLUTION" which is hereby fully incorporated by reference herein for all purposes.

Exception management module 138 is configured with rules for classifying exceptions and taking actions based on exceptions. One example embodiment of an exception management module 138 is described in U.S. patent application Ser. No. 15/836,354, incorporated by reference above.

A user at a shipper computer system 110 may access the shipping management system 120 through the provided interfaces 132 using account holder credentials and specify certain parameters, such as a carrier, mode, shipment status information, a tracking number and other information. Shipping management system 120 can generate user interfaces using data determined from the processing and present these interfaces to the user at the computer system 110. More specifically, in one embodiment, interfaces 132 may visually present shipment information, including predicted exceptions to the user.

As described above, data can be acquired from carriers from one or more sources. The shipping management system 120 can become aware of shipments from several sources. If a user uses the shipping management system to schedule a shipment, then the shipping management system will be aware of the shipment and can create a shipping record and corresponding initial event record when the shipment is executed by the shipping management system. In another example, a carrier will make the shipping management system 120 aware of an account holder's shipments via shipment report files, notifications, responses to requests, or other mechanism. In another example, users will make the shipping management system aware of shipments by entering, through a user dashboard, tracking numbers or other information corresponding to shipments executed through carrier systems 150.

If the shipping management system is configured to become aware of a shipment from multiple sources (via notifications from a carrier and from a user, for example) the system can determine that the information relates to an existing shipping record (for example, due to the use of a unique reference number and destination postal code), and will integrate the information, rather than create separate records for the same shipment.

Embodiments described herein can implemented in a variety of manners. In one example, ingestion modules 134 and normalization module 135 may be implemented in a data ingestion engine. The data ingestion engine ingests information from a plurality of carriers and normalizes the carrier-specific status codes. A scheduler module 139, which may also be part of a data ingesting engine, is used by the shipping management system to tell the data ingestion engine when to acquire additional information (e.g., updated tracking or status information, etc.) for a given shipment. The frequency of acquiring updated shipping information can be based on any desired factors.

Figure 4:
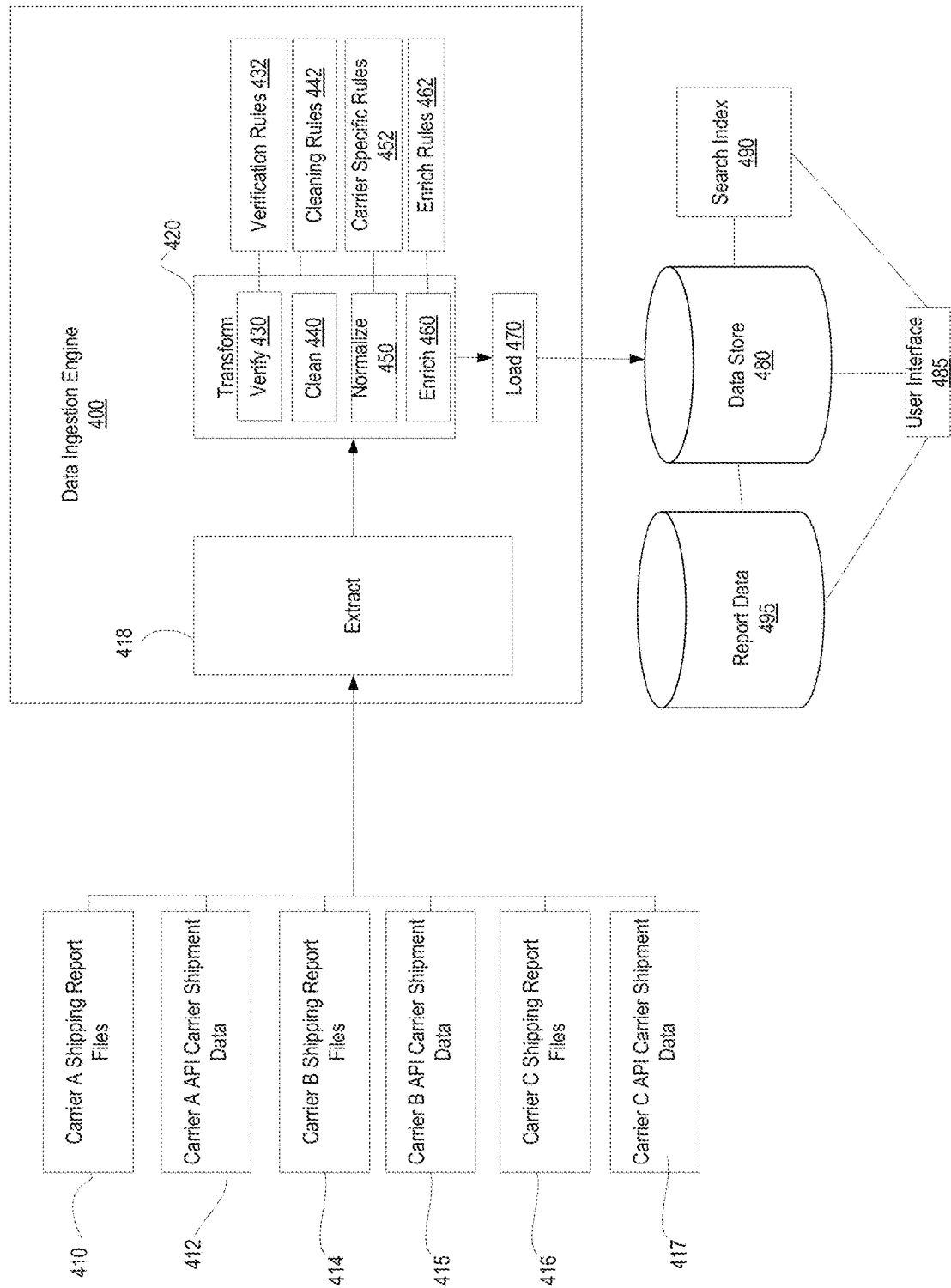
FIG. 4 is a diagrammatic representation of one embodiment an ingestion engine.

FIG. 4 is a functional block diagram depicting one example of a data ingestion engine 400. For clarity, FIG. 4 does not show other components of the shipping management system 120, for example some of the components depicted in FIG. 1. It can be noted that shipping management system 120 may request shipment information on behalf of an account holder (e.g., shipper), using the credentials for that account holder to retrieve information from a carrier system. Thus, shipping management system may receive information on shipments for that account holder regardless of whether the shipments were executed through the shipping management system. The data ingestion engine 400 may also receive shipment information from other sources, as described above.

FIG. 4 shows that data ingestion engine 400 receives shipment information from a plurality of carriers according to a plurality of integration paths. In particular, the shipping management system is configured to receive shipment report files for account holders and to query respective APIs for additional shipment data. Thus, ingestion engine 400 may receive Carrier A shipment report files 410, Carrier B shipment report files 414 and Carrier C shipment report files 416 and Carrier A API shipment data 412, Carrier B API shipment data 415, Carrier C API shipment data 417.

At extract step 418, ingestion engine 400 extracts carrier shipment records from received shipping record files or API shipment data. According to one embodiment, each shipment report file 410, 414, 416 provided by a carrier contains shipment information for a particular shipper (or other account holder) and is formatted according to a defined format, which may be carrier specific. Ingestion engine 400 can be configured to extract carrier shipment records for a shipper from the shipment report files. In some cases, the carrier shipment record from a shipment report file is simply unique shipment identifier (such as a tracking number or other unique, carrier-assigned shipment identifier) to indicate the existence of a particular shipment. In other cases, a shipment record may include status information.

Further, data 412, 415, 417 returned based on API calls may include shipment information formatted according to the respective public API 151. Ingestion engine 400 can be configured to extract carrier shipment records from the data returned via the APIs. In some embodiments, ingestion engine 400 may be configured to extract shipment identifiers from shipment report files and make API calls to collect additional information about the identified shipments.

Ingestion engine 400 may further implement a transform step 420, that may include several processes. For example, in the illustrated embodiment, transform step 420 includes processes to verify 430, clean 440, normalize 450 and enrich 460. At the verify 430 step, ingestion engine 400 applies verification rules 432 to verify the accuracy or validity of the data. The verification rules may depend on carrier, shipper or other parameters. For example, for a particular shipper, the verification rules may specify that an order number has to have a known number of characters, or start or end with a known sequence of characters. If the data does not match the expected data pattern, ingestion engine 400 can make a determination of whether to discard or ignore the data. Such rules may be specific to certain carriers and/or certain account holders (e.g., shippers). If the verification step identifies an issue, ingestion engine 400 may also attempt to correct errors, or search for data from another data source.

At clean 440 step, ingestion engine 400 applies data cleaning 442 rules to clean the input data carrier shipment records or to make data fields consistent. Examples of cleaning steps may include deleting leading or trailing spaces in a data field, standardizing zip code or state field formats.

At normalize step 450, ingestion engine accesses carrier-specific rules 452, which may be an example of rules 157, to map carrier-specific status codes, descriptions and exception flags to normalized status codes, descriptions and exception flags. As described above, data from a plurality of carriers or data sources is normalized, resulting in data that has common status codes across multiple carriers and other data sources. Another aspect of data normalization relates to information received that is not in the form of a status code. For example, some carriers may generate status or tracking information in the form of messages that may not be even internally standardized, for example, in the form of free-form text, text chosen from a list, etc. Ingestion engine 400 can be configured to analyze free-form text or similar messages and attempt to determine a normalized status. In one example, ingestion engine 400 uses word matching algorithms to match words in a message with key words that may indicate a particular status. In another example, machine learning or trained computers can be used to analyze and interpret the text in messages.

For a carrier shipment record associated with a shipper (or other account holder), ingestion engine 400 can traverse a rules document to determine the rules applicable to the carrier. In applying a rule, ingestion engine 400 determines if an input status code and/or status description matches a condition based on the specified matching rule (e.g., "matches exactly", "starts with", "ends with" or regular-expression based matching rule, that is applied to the input status code or status description). In some embodiments, applying matching rules may include parsing carrier provided transit data for specific codes or descriptive words (e.g., "arrived"). If the status pattern or status description pattern matches the condition according to the matching rule, then the normalized shipment status and exception flag, if appropriate, are set for the shipment, thus generating normalized shipping information.

The enrich 460 or enhance step can be used to enrich or enhance data according to enrich rules 462. In some examples, properties can be implied based on the data. For example, package tracking data typically includes a timestamp. The timestamp may or may not be universal, so viewing the timestamp, without knowing the context, may present a problem. In the context of tracking data, for example, the shipping management system can see from the data the time zone in which a status event occurred. The timestamp can then be enhanced to include the actual time zone, or the enrich step can convert the timestamp to a local or universal time, as desired. This can help prevent tracking data from being listed out of order, due to differing time zones.

In another example of data enrichment, if the origin or destination location (e.g., postal code) is missing, but that information is available on either the first tracking event (e.g., pickup) or the last tracking event (e.g., delivery), for example, then the shipment record location information can be inferred.

In another example of data enrichment, if a shipment has been executed on the shipping management system platform, when the shipping management system collects the original shipment weight and cost, those values can be stored onto the shipment record as original weight and original cost. As the same shipment is being ingested and processed into the shipping management system, the system will detect changes of weight and cost compared to the original shipment record then the system can persist those as actual weight and cost and can notify users of changes (or create alerts).

In another example of data enrichment, when ingesting a large number of shipments, which could be assigned to the wrong carrier in the data feed, the system can run a number of rules over the provided tracking number to verify whether its format or pattern is compatible with the provided carrier. If it is not, the system can attempt to correct the carrier by gathering carriers which match the format or pattern of the provided tracking number, and use rules to pick a winner if it can be safely done (e.g., only a single carrier is returned as a candidate).

Once the extracted data is transformed, ingestion engine 400 determines if the transformed data corresponds to an existing shipping record. To determine if the data refers to a new or existing shipping record, the shipping management system can look to fields such as a carrier SCAC (a 4 letter code), a carrier's unique tacking number, or other fields, for example. The shipping management system may also determine if an event for a shipment is duplicative of an event in an event record. For example, shipping management system can compare the normalized event code, time stamp and other fields to event records for a shipment to determine if the event record is duplicative.

The new transformed data is then loaded (step 470) into the data store 480, which may be one example of data store 122. If the data does not correspond to an existing shipping record, ingestion engine 400 creates a new shipping record for the data. If the data corresponds to an existing shipping record and is not duplicative, the shipping management system appends or updates an existing shipping record with the new data. Updating a shipping record may include updating the event records associated with the shipping record. When updating an existing record with a new event, the shipping management system can determine if the new event is out of order by comparing the new event's timestamp to the timestamp of the timestamp of the latest event record associated with the shipment. If the time stamp of the new event is later than the timestamp of the latest event record, shipping management system can add an event record (e.g., add a record to the event records of FIG. 3) and update the status in the shipping record (e.g., update the shipping record of FIG. 2) with the new status and, in some cases, exception. If, however, the time stamp of a new event for a shipment is prior to the timestamp of the latest event record for a shipment, the shipping management system may add an event record for the shipment without updating the status of the shipping record.

As discussed above, a carrier may provide data through multiple sources, such as through an API and shipment report files. In some cases, the API and shipment report files may provide different events for the same shipment. By ingesting shipment information from multiple sources, the shipping management system can provide a unified view that provides a more complete and accurate view of a shipment than would be provided by either source alone. Moreover, by ingesting data from multiple carriers for a shipper (or other account holder), the shipping management system can provide a unified view of shipments across carriers.

FIG. 4 also shows a user interface (UI) 485. In one example, the UI 485 is a web-based user interface comprising one or more web pages. As shipment data is extracted, transformed, and stored, a search index 490 is updated to reflect the new or updated data. In some embodiments, the search index 490 is updated in real-time, or close to read-time, as new events, shipments, etc. are entered into the system. The search index 490 enables a user, via the UI 485 to search the data store 480, as desired. In some embodiments, a separate report data store 495 is used to store data that is appropriate for reporting.

According to one embodiment, the shipping management system may receive a request from a client computer (e.g., a shipper computer system 110) for an interface containing data associated with a user account and substantially simultaneously initiate generation of a responsive interface 485. In particular, the shipping management system uses index 490 to determine a first set of results that represent the shipping records associated with the account and provides a responsive web page to display results from the first set of results. The web page may include normalized tracking data. Because the tracking data returned is, in some embodiments, determined prior to receiving the request and stored in a normalized format across carriers, the shipping management system can quickly retrieve the tracking data for shipments related to an account and generate an interface that presents a unified view containing tracking data for shipments determined from multiple data sources and from multiple carriers. Thus, the shipping management system can respond to a request for an interface in the times expected by users of the Internet and without a web browser timing out.

UI 485 provides controls to allow a user to filter the results. In addition, or in the alternative, UI 485 can allow a to request shipment data for a specific shipment. Responsive to a shipment-specific request, shipping management system can access the event records for the shipment and update UI 485 with additional data specific to the shipment. UI 485 may also include one or more web pages that display performance indicators to allow a user to directly compare carriers.

As discussed, a shipping management system can obtain data from a variety of sources, including using API calls to request data from external systems that provide a public API. If API calls are made too frequently, excess calls may be generated wasting computing and network resources. Moreover, a carrier's API call limit may be exceeded, possibly prohibiting future API calls. If API calls are made too infrequently, the shipping data stored by the shipping management system may be stale and out-of-date. It is therefore a goal to balance the need for fresh data with the need to conserve resources. According to one embodiment, the shipping management system can intelligently determine when to make an API call. As described above, a shipping management system may use a combination of rules and signals that matches each individual shipment with its own update schedule to maximize the freshness of data, respect carrier API call rate limits, and optimize the use of computer and network resources.

An example ingestion engine 400 is discussed above with respect to FIG. 4. As discussed, ingestion engine 400 can obtain data from a variety of sources, including using API calls to request data from external systems that provide a public API. Below is a discussion of an exemplary embodiment of a system for dynamically scheduling API-based shipment updates across multiple carriers.

Figure 5:
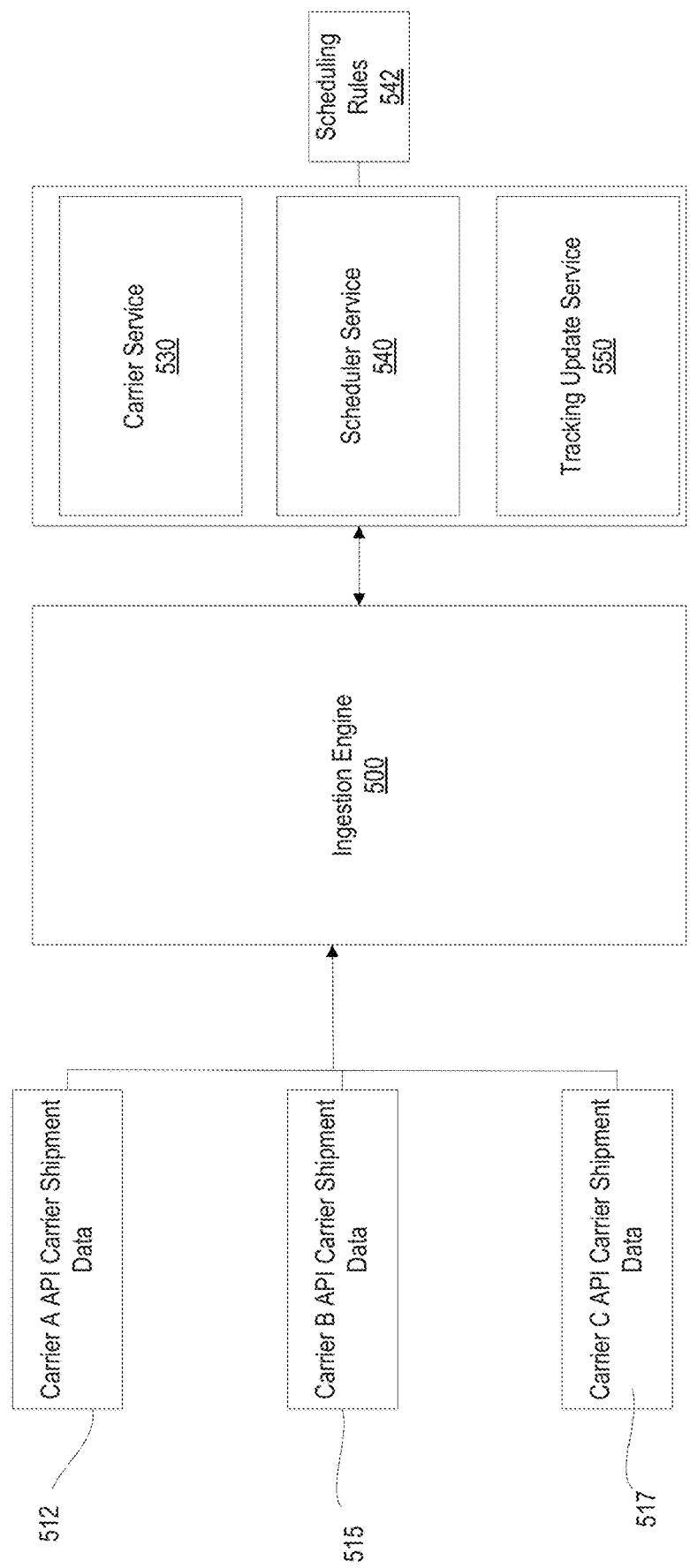
FIG. 5 is a diagrammatic representation of one embodiment a system configured to dynamically schedule application programming interface (API) calls to update shipping records.

FIG. 5 is a functional block diagram depicting one example of a system that provides mechanisms for dynamically scheduling API-based shipping updates. For clarity, FIG. 5 does not show other components of the shipping management system, for example some of the components depicted in FIGS. 1 and 4. FIG. 5 shows a data ingestion engine 500, which may be an embodiment of a data ingestion engine 400. Data ingestion engine 500 receives shipping information from a plurality of carriers. For example, data ingestion engine 500 can receive Carrier A API carrier shipment data 512, Carrier B API carrier shipment data 515, and Carrier C API carrier shipment data 517. Data ingestion engine 500 may also receive shipping information from other sources, as described above. As described in detail above, the data ingestion engine 500 extracts data from the carriers and transforms and stores the extracted data into the proper format or structure for use by the shipping management system.

Data ingestion engine 500 includes a carrier service 530 which has the responsibility of generating API calls to the carriers for current shipping status and/or tracking information ("updates"). For example, the carrier service 530 can use a tracking number for a shipment and generates an API call for requesting status and/or tracking information for that shipment. The generated API call is passed to tracking update service 550 and tracking update service 550 makes the API call and passes the response to carrier service 530. The carrier service 530 may also perform one or more of the data transformation steps discussed above on data returned in response to an API call. In some embodiments, a single carrier service 530 is configured to work with all of the carriers, although the carrier service 530 may include carrier-specific modules to make calls to the carrier-specific APIs (e.g., APIs 151 of FIG. 1).

The scheduler service 540 is responsible for scheduling the shipping information updates, including the updates from API calls. That is, scheduler service 540 is responsible for determining when to make API calls (i.e., when to request updates). When the scheduler service 540 determines that a request for an update for a particular shipment is desired, the carrier service 530 generates the API call and the tracking update service 550 makes the API call and passes the response to carrier service 530.

As mentioned above, the shipping management system uses a combination of rules (e.g., scheduling rules 542) and signals to determine when to request updates, in in order to maximize the freshness of shipping data, while respecting API request limits and optimizing the use of computer and network resources. There are various factors and conditions that will tend to make updates either more or less urgent. The scheduling rules can be configured so that when a factor or condition makes an update urgent, the scheduler service 540 schedule updates to occur more frequently and when a factor or condition makes an update less urgent, the scheduler service 540 scheduled updates to occur less frequently.

In one embodiment, the scheduling rules are hard-coded. In another embodiment, the scheduling rules are user configurable and shipping management system can provide an interface to allow a user with appropriate privileges to compose or edit scheduling rules. The scheduling rules 542 can include both carrier specific rules and carrier generic rules, depending on the particular types and detail of information provided by various carriers. Some rules may be configured to apply to a class of carriers.

A scheduling rule 542 may specify scheduling of a next update based on the completeness of information in a shipping record for a shipment. For example, if the shipping management system discovers a new shipment that the system has not seen yet (e.g., from a shipment record file), the shipping record for the shipment may be missing relevant information. A scheduling rule 542 may specify, for example, that if a shipping record is missing particular pieces of information, the scheduler service 540 should schedule an immediate initial status API request to the carrier's public API to retrieve information about the current status of the new shipment. Or, if the new shipment is a shipment created through the shipping management system (discussed above), and the shipping management already has information about the shipment, a scheduling rule 542 may specify how the scheduler service 540 is to use the information to determine a time for the next update. For example, if the shipment created by the system has a scheduled shipping date one week in the future, that can be taken into account by the scheduler service 540, and the next scheduled update can be delayed, since there is no need to track the shipment before it is scheduled to ship.

As another example, a scheduling rule 542 may specify scheduling based on an amount of information returned in an update. For example, some carriers provide a complete shipping history with each update, while others provide only the new information. Taking that into consideration, the scheduling rules 542 may be configured to cause scheduler service 540 to schedule less frequent updates from the class of carriers that provide complete histories, since anything missed will be received at the next update. In contrast, the scheduling rules 542 can be configured to cause the scheduler service 540 to schedule more frequent updates from the class of carriers that provide no history, since anything missed since the last update will remain unknown.

Another factor relates to the interest or activity of a user or recipient. For example, a scheduling rule 542 can specify that if a user is actively looking at the shipment (e.g., has requested tracking information, has subscribed to tracking updates from the shipping management system, or otherwise taken an interest in the shipment), then the scheduler service 540 is to increase the frequency of updates for that shipment, to ensure that the interested party gets updated information more often. Whether an account holder, intended recipient or other user is actively looking at a shipment may be recorded in the shipping record by the shipping management system (e.g., recipient notification field 212 in FIG. 2 can be used to indicate whether the recipient has subscribed for updates).

Scheduling rules 542 may specify scheduling based on a most recent status (e.g., as indicated in the status field 220 or exception field 222 of a shipping record of FIG. 2). Thus, the tracking information for two shipments by the same carrier with different status may be updated at different rates. Similarly, the information for two shipments by the same carrier with the same status, but different exceptions may be updated at different rates.

Another factor that can be used relates to the location of a shipment relative to its destination. Depending on the shipment status and/or type of exception, accurate up-to-date tracking information can become more or less important. For example, if a package gets relatively close to its destination, the frequency of updates can be increased. The determination of relative location can be based on any desired data, for example, the city or postal code from the last update, GPS coordinates from the last update, etc.

Scheduling rules 542 can be layered one over another and prioritized such that some will take precedence over others. For example, if a carrier has a strict fixed API request limit of five API requests per shipment per day, a rule can specify that no more than five requests be sent in a given day (e.g., the highest frequency at which API calls for a shipment for that carrier can occur is every 288 minutes). Such a rule could supersede lower priority rules, since going over the API request limit may prohibit future updates.

Generally, the scheduler service 540 will analyze all active shipments and track when each shipment is due for the next update. The scheduler service 540 is responsible for taking that information and periodically (e.g., every minute or other period) determining which shipments should be updated. Scheduler service 540 can signal carrier service 530 to generate an API call for a shipment when a shipment is ready to be updated.

In some cases, a carrier may allow for batch requests where a single request can include a list of tracking numbers. For such a carrier, scheduler service 540 can pass a batch of shipment identifiers (internal shipment IDs, tracking numbers or other shipment identifiers) to carrier service 530 for carrier service 530 to generate the API call for a batch of shipments.

While any desired scheduling rules 542 can be implemented for dynamically scheduling API-based shipment updates across multiple carriers, following are several exemplary guidelines that can be used to configure rules. Numerous other rules and guidelines are also possible.

Exemplary guidelines for rules based on the status of a shipment:
1) if a shipment has not yet shipped, then start tracking after the ship date
2) if a shipment is in transit, but the estimated delivery date is more than X days away, then track less frequently
3) if a shipment is or is about to be out for delivery, then track the shipment more frequently (due to the large number of valuable exceptions, e.g., an incorrect address, generated during delivery)

Exemplary guidelines for rules based on shipment interest:
1) if there are subscribers to the shipment alerts, then track the shipment more frequently Exemplary guidelines for rules based on carrier capabilities:
1) if a carrier provides a full tracking history with each update, then track less frequently than carriers that do not
2) if carrier has documented API request limits, such as number of requests per tracking number per day, then adjust the tracking schedule to always be below that limit Some example rules based on the foregoing guidelines include, but are not limited to:
1) If the shipment is scheduled but not yet in transit then i) update once a day if the shipment is 2 or more days away from shipping; ii) else update once per 6 hours;
2) If the shipment is in transit then update once per hour;
3) If the shipment is out for delivery then update once per 15 minutes;
4) If the shipment is delivered then do not update.

According to one embodiment, the scheduling service 540 may maintain one or more scheduling fields for a shipping record (e.g., in a shipping record table or associated table). In FIG. 2, for example, the shipping records include SCHEDULE field 224 to indicate a scheduled update time. The scheduling service 540 may access the shipping records and determine if the current time is equal to later than the scheduled update time in a scheduling field for that record. If so, the scheduling service 540 can generate a task to carrier service 530 to collect information to update the shipping record. For example, the scheduling service 540 can scan the records of FIG. 2 and determine that the time current time is 07:40 or later and thus generate a task to carrier service 530 to update the shipment tracking information for SHIPMENT_ID 1000. As described above, the scheduling service 540 may generate a task to update a batch of shipping records.

According to one embodiment, scheduling service 540 may review the timestamp of the last (in time) event record associated with a shipping record and use the event timestamp as an indication of when the shipping record was last updated (last update time). For example, scheduling service 540 may scan the shipping records of FIG. 2, access the event records of FIG. 3 for SHIPMENT_ID 1000 and determine that the last update time for SHIPMENT_ID 1000 was 2018-12-23T06:40. In another embodiment, the scheduler may store a last update time in, for example, a scheduling field for a shipping record, updating the last update time when the scheduler generates a task to update a shipping record.

When an indication of the last update time (e.g., last event record time or last updated time generated by the scheduling service 540) is after the scheduled update time, this can indicate that the scheduler should calculate a new scheduled update time. Thus, when the scheduler periodically checks the shipping records to determine if the current time is after the scheduled update time, it may also check the previous update time for a record to determine if the scheduled update time should be recalculated rather than an update requested. The scheduled update time can be determined based on the scheduling rules 542. The scheduling rules can be selected to prevent or reduce exceeding a carrier's rate limits.

In another embodiment, the scheduler may determine the next scheduled update time as the shipping management system ingests data corresponding to a shipping record. As the skilled artisan will appreciate, scheduling may be tracked in a variety of other manners.

Some carriers may limit the maximum number of calls for a particular account to x number of calls per hour (regardless of shipment). Scheduler service 540 may maintain a budget for a carrier API based on the API rate limit for the carrier. In some cases, if a task would cause the budget to be exceeded, scheduler service 540 may queue the task to be sent out at a later time so that the rate limit is not exceeded. In addition, or in the alternative, scheduler service 540 may implement other techniques to smooth the volume of calls made to an API over time.

Figure 6:
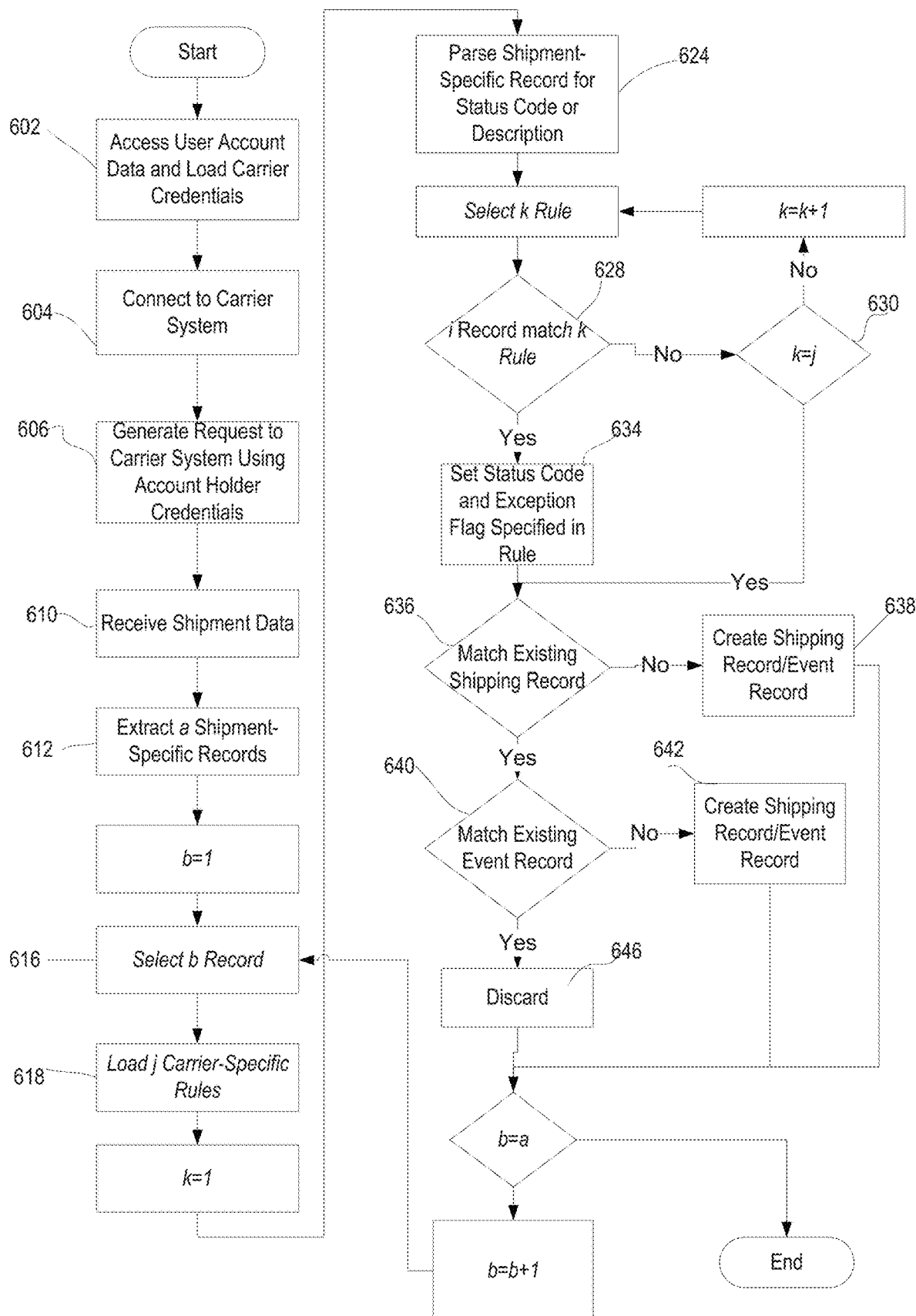
FIG. 6 is a flow chart of one embodiment of a method for processing carrier-specific shipment records.

FIG. 6 is a flow chart illustrating one embodiment of a method for processing shipment data. The method of FIG. 6 may be performed by a shipping management system (e.g., shipping management system 120), including by an ingestion engine (e.g., ingestion engines 400, 500). At step 602, a shipping management system can access user account data for an account holder (e.g., access a user profile for an account holder) and load that account holder's carrier credentials for a carrier. The shipping management system can connect to a carrier system and generate a request to the carrier system using the account holder's carrier credentials (step 604 and 606). For example, the shipping management system may provide the account holder's carrier credentials to the carrier system in conjunction with sending and API call or requesting a shipment report file from the carrier system. At step 610, the shipping management system receives shipping information corresponding to the provided carrier credentials, where the shipping information is formatted according to a known format used by the carrier. At step 612, extracts 'a' shipment records. Each carrier-specific shipment record may uniquely identify a shipment by a unique identifier, such as a tracking number or other shipment number or some combination of information.

At step 616, the shipping management system selects a shipment record from the input data for processing. At step 618, the shipping management system loads 'j' carrier-specific mapping rules for the carrier from which the shipment record was received. At step 624, the shipping management system parses the selected shipment record to determine a status code or description contained in the shipment record. At step 628, the shipping management system applies a selected carrier specific rule to a selected shipment record. If the selected shipment record matches the selected carrier-specific rule, control passes to step 634, where the shipping management system transforms the record by setting the status code and, in some cases, exception flag for the shipment record based on the selected rule, thus generating normalized shipping data. Otherwise, the shipping management system repeats step 628 for each of the carrier-specific rules until a match is found or the rules are exhausted.

At step 636, the shipping management system determines if the transformed shipment record matches a shipment for which a record already exists in shipping management system. To determine if the data refers to a new or existing shipping record, the shipping management system can look to fields such as a carrier SCAC (a 4 letter code), a carrier's unique tacking number, or other fields, for example.

If the transformed shipment record does not match a shipment, control passes to step 638. Shipping management system can create a new shipping record for the shipment and create an association between the shipping record and the account holder. The shipment represented by the shipment record may be assigned an internal id in shipping management system. If the transformed shipment record indicates an event (e.g., includes shipping status information), shipping management system can also create a shipping event record and associate the event record with the shipping record.

If the transformed shipment record does match an existing shipment in shipping management system, shipping management system can determine if the transformed shipment record contains a duplicative event for a pre-existing shipment in shipping management system (step 640). For example, shipping management system can compare the normalized event code, time stamp and other fields to event records for a shipment to determine if the event record is duplicative. If the event is not duplicative, the shipping management system creates a new event record and associates the new event record with the shipment (step 642). The shipping management system may also update that status codes and exception codes in the shipping record. If the transformed shipment record is duplicative of an existing event record for a shipment, the transformed event record can be discarded (step 646). Steps 616-646 can be repeated for each shipment event record in a set of input data.

The steps of FIG. 6 may be repeated across multiple integration channels for multiple carriers to develop unified shipment data for an account holder. The steps of FIG. 6 are provided by way of example. The steps may be practiced in different orders, steps omitted, additional steps performed, or alternative steps practiced.

Figure 7:
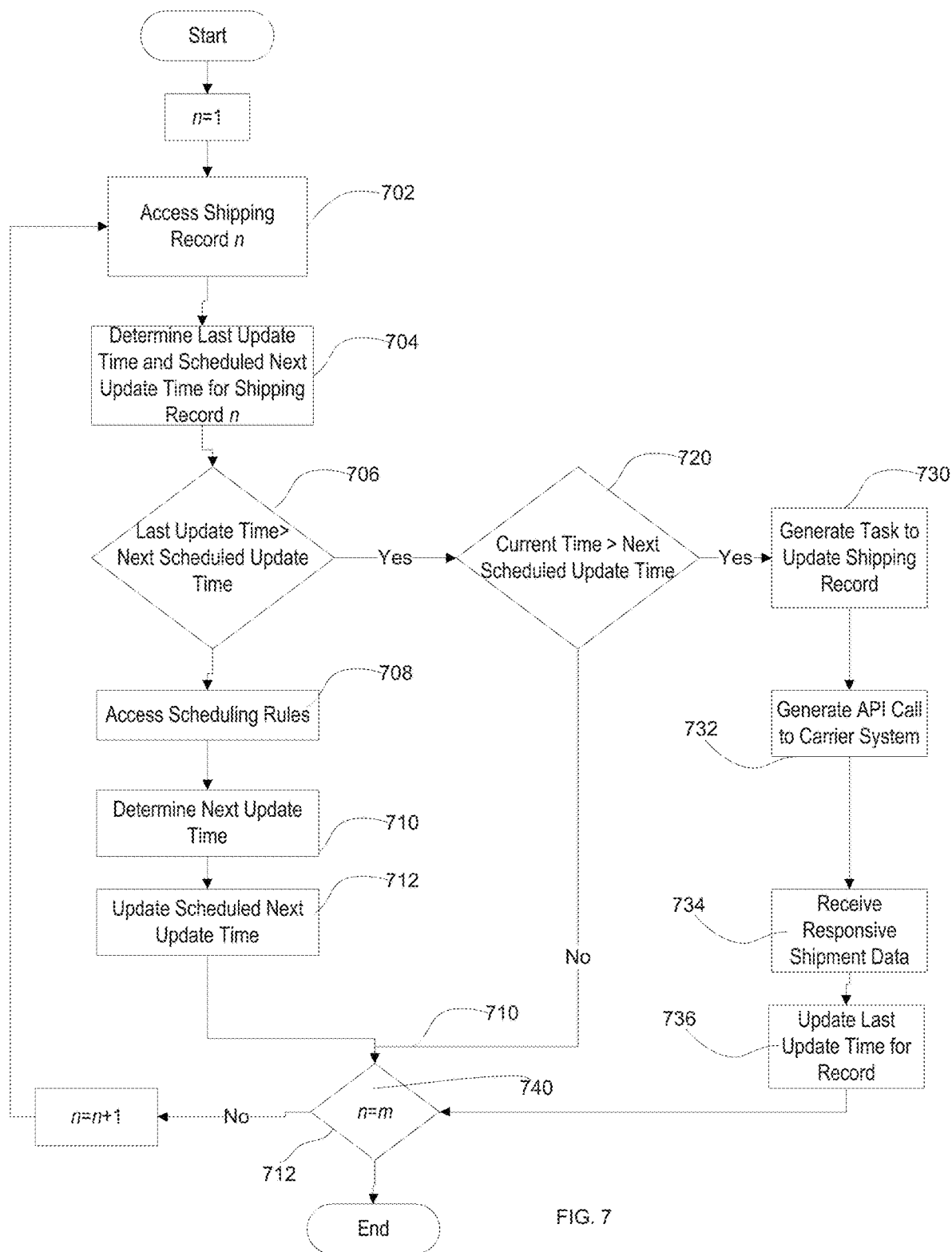
FIG. 7 is a flow chart illustrating one embodiment of a method for scheduling API calls.

FIG. 7 is a flow chart for dynamically scheduling API calls for 'm' shipments. The method of FIG. 7 may be performed by a shipping management system (e.g., shipping management system 120), including by an ingestion engine (e.g., ingestion engines 400, 500). More particularly, in some embodiments, some or all of the steps of the method of FIG. 7 may be performed by a scheduler service (e.g., scheduler service 540). According to one embodiment, the shipping management system may identify the 'm' shipping records as those records that do not have a DELIVERED status. Thus, for example, the shipping management system may query a data store for shipping management records where STATUS NOT DELIVERED.

At step 702, the shipping management system accesses shipping record 'n' selected from the 'm' shipping records and, at step 704, determines a next scheduled update time and a last update time from the shipping record. For example, the shipping management system may access the shipping record for SHIPMENT_ID 1000 (the shipping event record of FIG. 2) and the associated event records (FIG. 3) and determine that the next scheduled update time is 2018-12-23T07:40 from SCHEDULE field 224 and the last updated time is 2018-12-23T06:40 from CREATED_DATETIME field 238. At step 706, the shipping management system determines if the last update time for the shipment is after the next scheduled update time.

If the last update time for the shipment is after (or equal to) the next scheduled update time, this indicates that the next update for the shipment has not been scheduled since the last update and control can pass to step 708. The shipping management system accesses the scheduling rules (step 708) and applies the scheduling rules to determine the next update time (step 710). For example, the shipping management system may match the shipping record to a rule (e.g., a carrier specific or carrier generic rule) based on an indication of shipment status (e.g., field 220), an indication of an exception (e.g., field 222), an indication of interest (e.g., field 212) or other information contained in or otherwise associated with the shipping record n. At step 712, the shipping management system updates the next scheduled update time with the next update time determined at step 710. For example, the shipping management system can update the SCHEDULE field in the shipping record.

If the last update time for the shipment is before the next scheduled update time as determined at step 706, control can pass to step 720. The shipping management system determines if the current time is after (or equal to) the next scheduled update time for shipping record n and, if so, control passes to step 730. Otherwise control can pass to step 740.

At step 730, the shipping management system can generate a task to update the shipping record. In some cases, this may include generating a task to update a batch of shipping records. Based on the task, the shipping management system can make an API call to the carrier using the credentials for the shipper or other account hold with whom shipping record n is associated to request an update for the shipment (e.g., by passing the tracking number for the shipment)(step 732). At step 734, the shipping management system can receive the shipment data. The responsive shipment data can be processed as described, for example, in FIG. 6.

The last update time for shipping record n can be updated (step 736). In some embodiments, the shipping management system will update the last update time for the shipping record based on generating the task (step 730) or sending the API call (step 732). In other embodiments, the last update time is the time stamp of the last in time event record for a shipment and thus the last update time for a shipment is implicitly updated when a more recent event record is received for the shipment. The last update time may also be updated in other ways. As indicated at 740, 742 the steps 702-736 may be repeated for each shipping record in the set of 'm' shipping records as appropriate.

The steps of FIG. 7 are provided by way of example. The steps may be practiced in different orders, steps omitted, additional steps performed, or alternative steps practiced.

Figure 8:
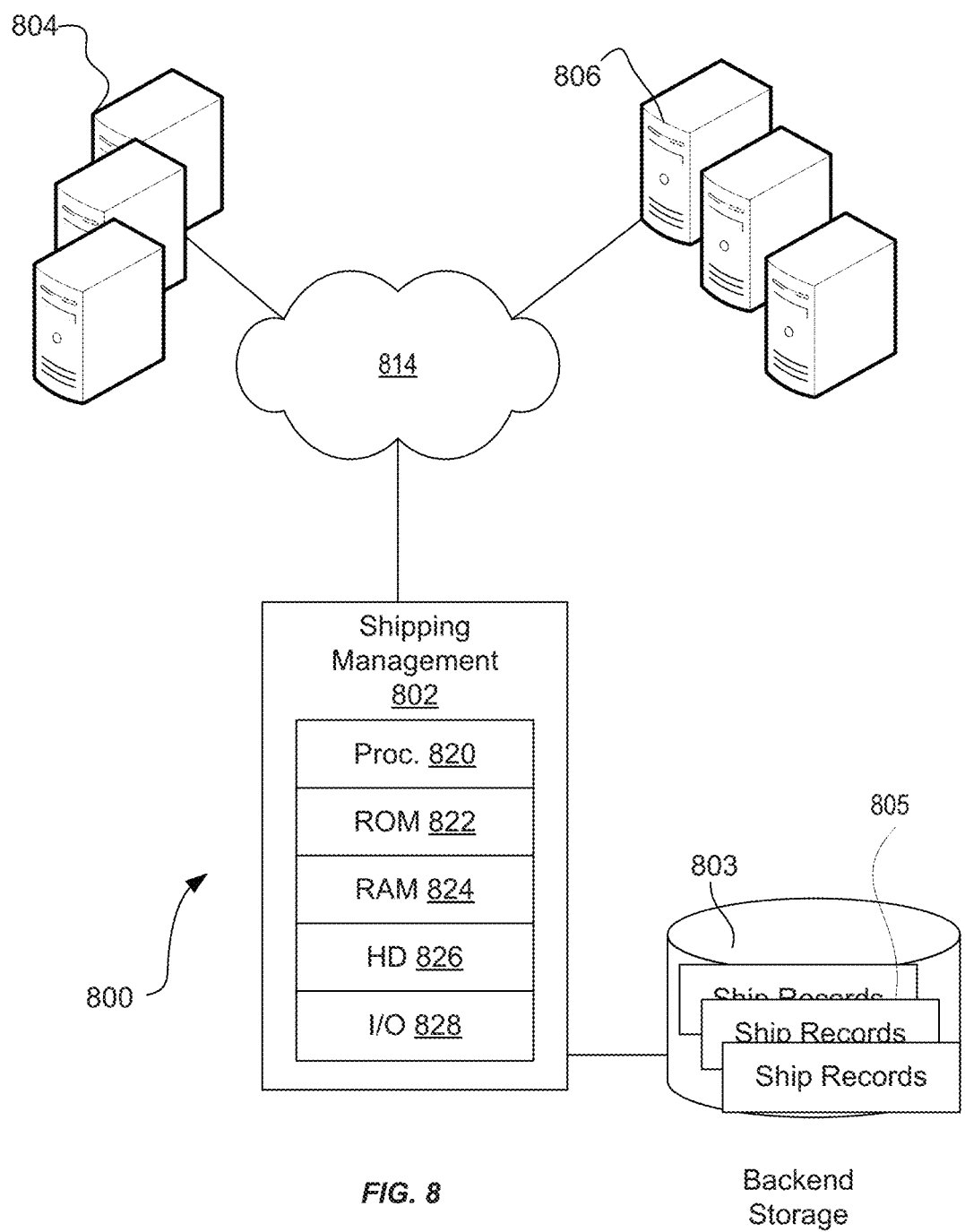
FIG. 8 is a diagrammatic representation of one embodiment of a distributed network environment.

FIG. 8 is diagrammatic representation of a distributed network computing environment 800 where embodiments disclosed can be implemented. In the example illustrated, network computing environment 800 includes network 814 that can be bi-directionally coupled to shipping management 802, shipper computer systems 804, carrier computer systems 806, and other computer systems. Network 814 may represent a combination of wired and wireless networks that network computing environment 800 may utilize for various types of network communications known to those skilled in the art. Shipping management system 802 can be bi-directionally coupled to a data store 803 storing a searchable collection of normalized shipping records 805 and associated event records.

For the purpose of illustration, a single system is shown for shipping management system 802. However, shipping management system 802 may comprise a plurality of computers (not shown) interconnected to each other over network 814.

Shipping management system can include a processor 820 (e.g., a CPU or other processor), read-only memory ("ROM") 822, random access memory ("RAM") 824, hard drive ("HD") or storage memory 826, and input/output device(s) ("I/O") 828. The I/O devices can include a keyboard, monitor, printer, electronic pointing device (such as a mouse, trackball, stylus, etc.), or the like. In various embodiments, the computer has access to at least one database over the network. Shipper computer systems 804 and carrier computer systems 806 may each also include processors, memories, I/O and other computer components. Each search system 802, shipper computer system 804 and carrier computer system 806 of FIG. 8 may have more than one processor, ROM, RAM, HD, I/O, or other hardware components. For the sake of brevity, shipping management computer system 802 is illustrated as having one of each of the hardware components, even if more than one is used.

Portions of the methods described herein may be implemented in suitable software code that may reside within ROM; RAM; HD or other computer-readable memory. Shipping management system 802, for example, may include software components to implement a shipping management application 130. Shipping management system 802 may include software components to implement data ingestion engine 400, 500.

Embodiments may thus provide a unified view operator interface for shipping management data from multiple sources. The systems, methods, and products include one or more dashboards (for example, a web-based dashboard generated by an interface module) accessible by a user that is associated with an account holder. From the dashboard, the user can view various metrics and access functions of a shipping system, such as scheduling shipments. In some embodiments, a user can click on exceptions and/or tracking menu items to see information for shipments associated with the account holder or information for shipments that have exceptions or tracking information. Numerous other embodiments are also possible.

As described above, carriers have different ways to describe shipping status (e.g., tracking) information and shipment problem (e.g., exception) information. The system described provides a model for shipping status and shipping exceptions that considers many modes (parcel, LTL, white glove, etc.) and scenarios across the shipping landscapes. The system described also provides mechanisms to collect data from carriers "as is" and bring that into the system. The system includes mechanisms to map and transform the "as is" carrier data into a normalized model. The system provides a user interface to view and search data in the model to get shipment status, to gain insight, and to take action on problematic shipments.

FIG. 9 is a diagrammatic representation of one embodiment of an operator interface comprising a web page 900 displaying a unified view of shipments across carriers. Web page 900 may be generated for a user associated with an account holder (e.g., a user at "Shipper X").

In the embodiment of FIG. 9, information from shipping records and/or other data structures is presented for individual shipments. The interface can include UI elements 902 to allow the user to filter the records based on attributes of the shipments contained in the shipping records or associated records, such as, for example status, mode, created date or other attributes. In the example of FIG. 9, the user has selected to view the shipments that have a normalized status of "IN_TRANSIT". The user may also select to view all shipments (e.g., all shipments associated with the account holder); shipments for the account holder that are associated with the normalized statuses of "SCHEDULED", "IN_TRANSIT", "APPOINTMENT", "OUT_FOR_DELIVERY", "DELIVERED", "CANCELED"; shipments for the account holder that are associated with normalized exception types; shipments for the account holder associated with predicted exception types; or other set of shipments as configured.

A wide variety of information can be displayed for each shipment. In the illustrated embodiment, for example, the information displayed for each shipment includes the tracking number, the bill of lading (BOL) number, the purchase order number (PO), origin, status, exception type and estimated delivery date. The user can select a particular shipment by clicking on the shipment to drill down into the details of the shipment.

Figure 10:
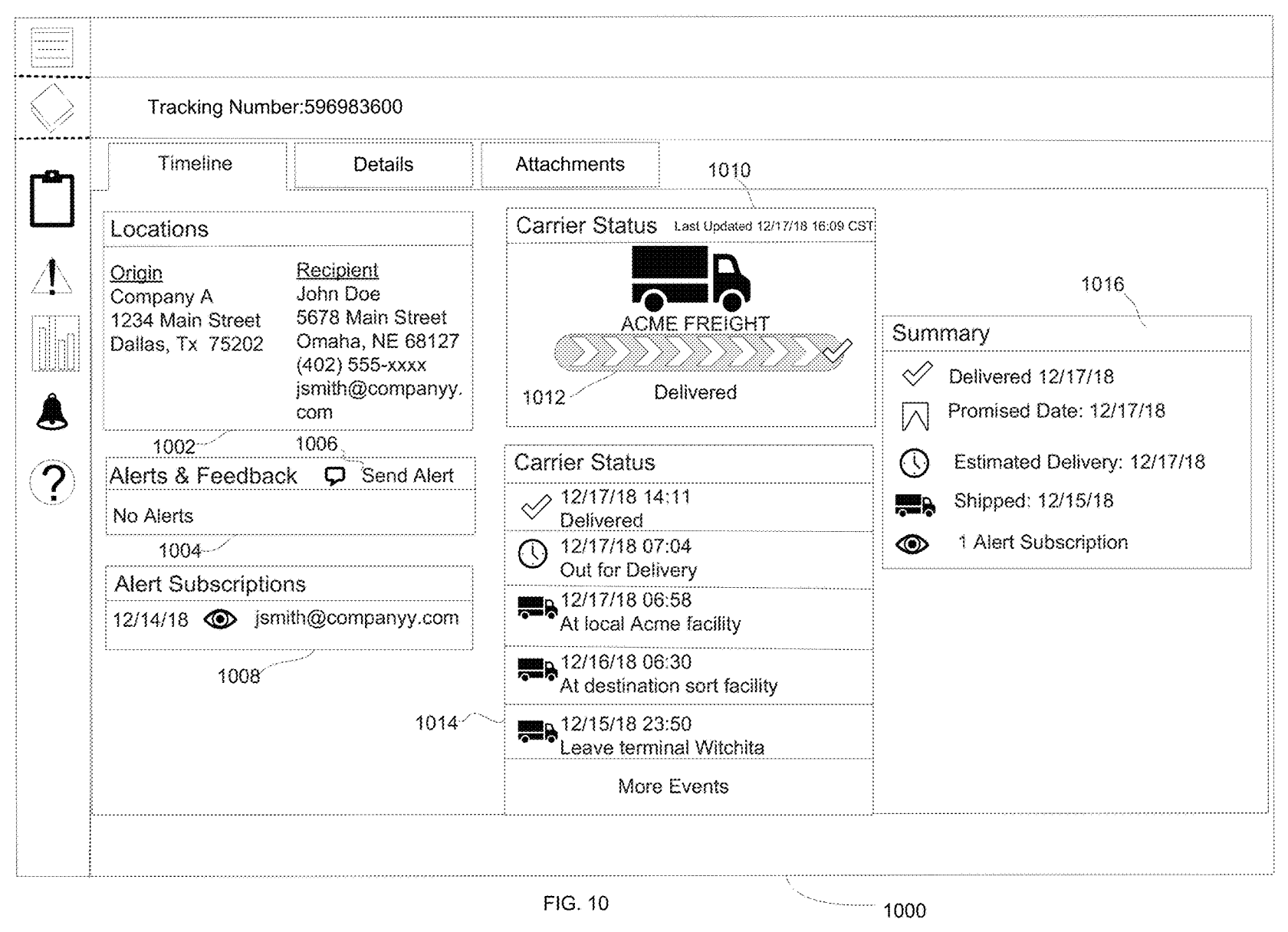

FIG. 10 is a diagrammatic representation of a web page 1000 displaying shipment specific information. Web page 1000 includes a number of UI elements, such as widgets, to display or receive various information about the shipment. Web page portion 1002 is configured to obtain and present the origin and recipient information, including recipient contact information associated with the shipment. Web page portion 1004 is configured to display any notifications/alerts associated with a shipment. The alerts may be system generated alerts (e.g., exception notifications that were automatically sent based on an exception) and user generated alerts. By clicking on tool 1006, the user can be provided with an interface that allows the user to compose and send a notification to the recipient. The shipping management system can store the user-generated alert in association with the shipment.

Web page portion 1008 is configured to display subscription information. A subscription indicates an intended recipient or other party has subscribed for notifications related to the shipment. The subscription information can be specific to a communications channel to which the subscription corresponds. For example, web page portion 1008 indicates a subscription for email notifications and includes an email to which to send the notifications. For an SMS notification subscription, on the other hand, the subscription information can include a mobile phone number.

Web page portion 1010 is configured to display the current status for the shipment. Web page portion can display various visual indicators 1012 (icons, colors, etc.) to indicate the status of the shipment (e.g., orange with triangle indicates a predicted exception, red with warning triangle indicates a carrier reported exception, red with calendar indicates that the shipment requires an appointment, green with a checkmark indicates that a shipment has been delivered. In the example of FIG. 10, the user selected to view information about a delivered shipment.

Web page portion 1014 is configured to display the history of statuses associated with the shipment. That is, web page portion displays a representation of the series of event records for the shipment in time order. In some embodiments, web page portion 1014 includes representation of exceptions in the time ordered series. Web page portion 1016 is configured to display a summary of information associated with the shipment.

Web page may include other widgets or portions. For example, web page 1000 may include portions to allow the user to start a customer support case related to the shipment, add notes to the shipment or provide other functionality related to a shipment.

Figure 11:
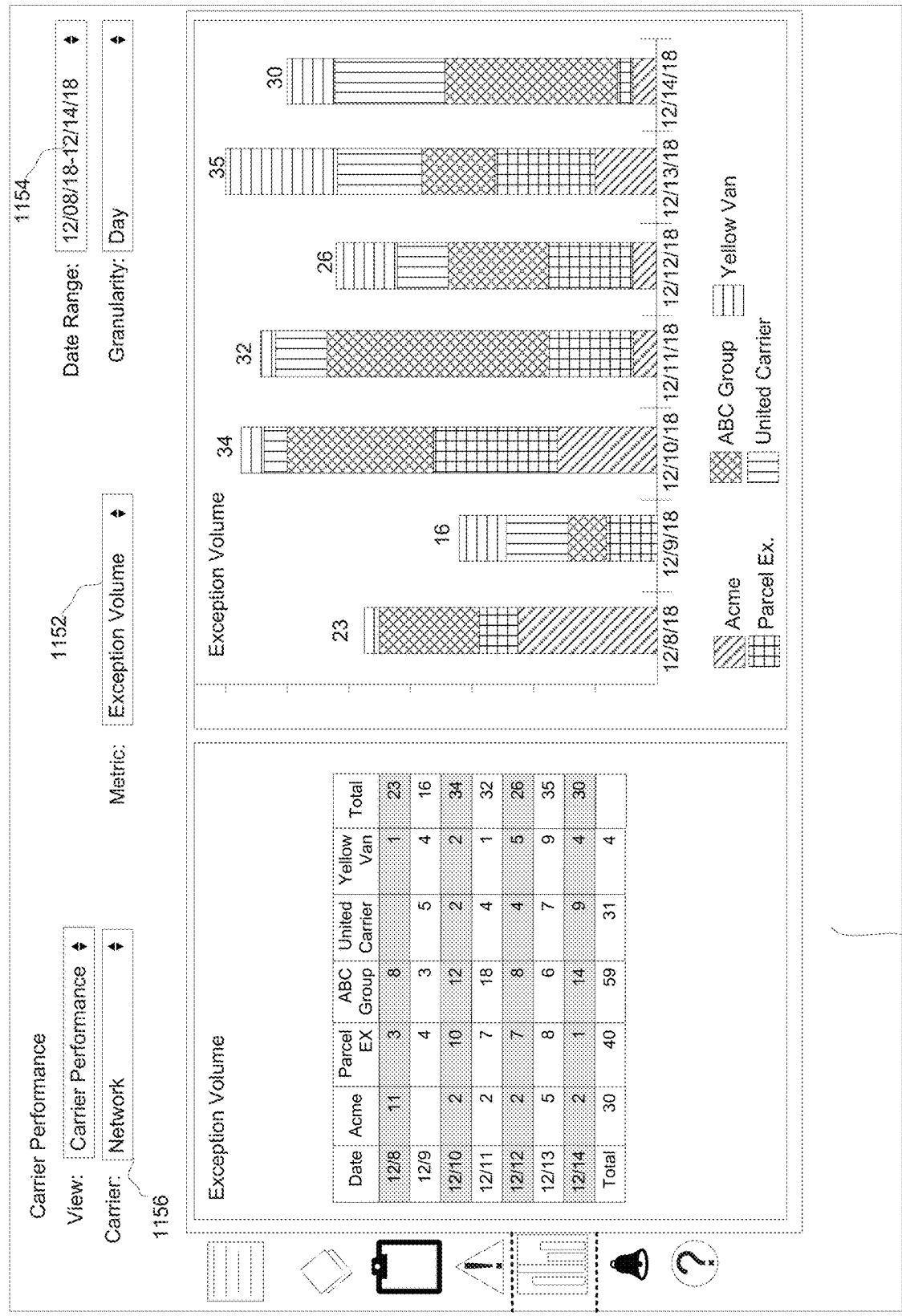
FIG. 11 is diagrammatic representation of one embodiment of an operator interface providing a comparison of carrier performance.

The shipping management system may also provide interface pages that represent performance across carriers. FIG. 11, for example, is diagrammatic representation of one embodiment of a carrier performance page 1150. Carrier performance page 1150 includes a UI element 1152 and other UI elements to allow a user to select a performance indicator and other performance parameters for determining performance (e.g., date range UI element 1154, carrier UI element 1156). Example performance indicators include, but are not limited to, on-time delivery percentage, damage rates, exception volume, volume of returned shipments, volume of refused shipments and other performance indicators. Based on the selection of performance parameters, the browser can send a request to the shipping management system and the shipping management system can aggregate data from records associated with the respective account holder to determine the values for the selected metric.

In the illustrated embodiment, the user has selected "exception volume" as the metric, a date range and all carriers represented in the records for the date range. In this example, it is assumed that the shipping records associated with the account holder include records for shipments carried by five carriers during the selected time period. As such, the shipping management system returns the volume of exceptions for each of the five carriers in the selected date range using the selected granularity.

FIGS. 9-11 are provided by way of example and not limitation. A shipping management system may utilize any suitable interface and can provide a variety of pages. Other example interface pages include, but are not limited to, those described in U.S. patent application Ser. No. 15/836,374, filed Dec. 8, 2017, entitled "SHIPPING MANAGEMENT SYSTEM WITH MULTI-CARRIER SUPPORT" and U.S. patent application Ser. No. 15/836,354 filed Dec. 8, 2017, entitled "SYSTEMS AND METHODS FOR PREDICTIVE IN-TRANSIT SHIPMENT DELIVERY EXCEPTION NOTIFICATION AND AUTOMATED RESOLUTION."

There are many advantages to a normalized representation of shipping data that are enabled by the system described in this disclosure. For example, with a normalized representation, the user and system can notify a recipient that their shipment is in a particular status, or has recently changed status, across different carriers. Moreover, the system can simplify integration with BPM solutions as a single BPM rule may be applied across multiple carriers. Thus, embodiments described herein facilitate integration with a variety of software rules-based processes, such as BPM processes to send messages (text, email, etc.) to recipients when shipments are delivered, pay a carrier for a shipment when the shipment is delivered, or to electronically file a claim when a shipment is damaged.

Embodiments can also compare key performance indicators across carriers. For example, the system can determine and report information relating to the on-time delivery percentage of Carrier A vs. Carrier B. In another example, the system can compare the damage rates between Carrier A and Carrier B. The system can also trigger key internal business processes when a shipment achieves a particular status or milestone. For example, the system can trigger a business Numerous other advantages and examples are also possible with the system.

Embodiments described above provide a unified view, enabling user to easily analyze and compare shipment information across multiple carriers. Since shipment data (e.g., tracking/status data, exception data, etc.) across multiple carriers is normalized by the system, users can easily compare the performance of different carriers, without having to manually interpret the varying terminologies and status codes used by the different carriers. For example, the system can determine and report information relating to the on-time delivery percentage of Carrier A vs. Carrier B. In another example, the system can compare the damage rates between Carrier A and Carrier B. The system can also enables a user to easily compare the expected delivery date (typically provided by a carrier) and a retailer's promised delivery date (typically provided by a shipper or retailer) with the actual delivery data. A user can therefore compare the relative performance of multiple carriers. The system can enable user to analyze other metrics in a similar manner. For example, the system enables user to easily compare the performance of different carriers with respect to damaged shipments, returned shipments, refused shipments, late deliveries, etc. The system also enables user to analyze shipments relating to special circumstances, such as returned shipments, shipments identified by customers as gifts, etc.

Another advantage of the shipping management system described above relates to sending notifications to users. Since the shipment data from multiple carriers is normalized, the system can easily send notifications to user regarding shipping events/shipping statuses of all of their shipments, even with multiple carriers involved. Without the system described above, a system would have to manage and send notifications to users separately for each carrier.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. Embodiments discussed herein can be implemented in a set of distributed computers communicatively coupled to a network (for example, the Internet).

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A shipping management system comprising:
  a memory configured with:
    shipping records representing shipments from a plurality of carriers; and
    a plurality of scheduling rules respectively corresponding to the plurality of carriers, wherein a first scheduling rule of the plurality of scheduling rules specifies a number of application programming interface (API) calls allowed over a given time period for a first carrier of the plurality of carriers, wherein a second scheduling rule of the plurality of scheduling rules specifies scheduling based on whether information returned by a second carrier of the plurality of carriers comprises a complete shipping history with each update, and wherein the first scheduling rule of the plurality of scheduling rules is prioritized over the second scheduling rule of the plurality of scheduling rules, and wherein the plurality of scheduling rules are configured to limit the update of the API calls to within respective rate limits of the plurality of APIs;
  a processor coupled to the memory; and
  a non-transitory computer readable medium comprising a set of computer executable instructions, the computer executable instructions executable by the processor to:
    dynamically schedule, according to the plurality of scheduling rules and accounting for the first scheduling rule being prioritized over the second scheduling rule, updates to update the shipping records;
    based on the dynamic scheduling, issue update API calls using a plurality of APIs respectively corresponding to the plurality of carriers to request shipment data for the shipments, such as to optimize use of computer and network resources;
    using a machine learning model to analyze and interpret the shipment data returned in response to the update API calls; and
    update the shipping records based on the shipment data that was analyzed and interpreted by the machine learning model.

2. The shipping management system of claim 1, wherein the computer executable instructions are executable by the processor further to:
  access a selected shipping record representing a shipment by a carrier of the plurality of carriers;
  determine a last update time for the selected shipping record and a next scheduled update time for the selected shipping record;

based on a determination that the last update time for the selected shipping record is after the next scheduled update time for the selected shipping record:
  match the selected shipping record to a carrier specific scheduling rule for the carrier; and
  update the next scheduled update time for the selected shipping record based on the carrier specific scheduling rule; and based on a determination that a current time is after the next scheduled update time:
  create a task to update the selected shipping record;
  generate an API call to a carrier system of the carrier to request a status update for the selected shipping record; and
  update the selected shipping record based on shipment information returned in the response to the API call.

3. The shipping management system of claim 2, wherein the memory is further configured with carrier credentials for a user account and the computer executable instructions are executable by the processor further to connect to the carrier system on behalf of a user using the carrier credentials.

4. The shipping management system of claim 2, wherein the carrier specific scheduling rule specifies an update frequency based on a shipment status indicated in the selected shipping record.

5. The shipping management system of claim 2, wherein the carrier specific scheduling rule specifies an update frequency based on an exception indicated in the selected shipping record.

6. The shipping management system of claim 2, wherein the carrier specific scheduling rule specifies an update frequency based on an indication of interest indicated in the selected shipping record.

7. The shipping management system of claim 2, wherein the last update time is a time associated with a last in time event recorded for the shipment by the shipping management system.

8. The shipping management system of claim 1, wherein the computer executable instructions are executable by the processor further to:
  receive carrier-specific shipment records based on the update API calls;
  apply respective carrier-specific mapping rules from a set of carrier-specific mapping rules to the carrier-specific shipment records to map status codes or descriptions in the carrier-specific shipment records to generate normalized shipping information for shipments across the carriers, the normalized shipping information comprising normalized status codes; and
  update the shipping records with the normalized shipping information.

9. The shipping management system of claim 8, wherein the computer executable instructions are executable by the processor further to receive carrier-specific shipment records from a particular carrier via a plurality of integration paths.

10. A computer program product comprising a non-transitory computer readable medium storing a set of computer executable instructions, the computer executable instructions executable by a processor to:
  dynamically schedule, according to a plurality of scheduling rules respectively corresponding to a plurality of carriers, updates to update shipping records representing shipments by the plurality of carriers, wherein a first scheduling rule of the plurality of scheduling rules specifies a number of application programming interface (API) calls allowed over a given time period for a first carrier of the plurality of carriers, wherein a second scheduling rule of the plurality of scheduling rules specifies scheduling based on whether information returned by a second carrier of the plurality of carriers comprises a complete shipping history with each update, wherein the first scheduling rule is prioritized over the second scheduling rule, and wherein the updates are dynamically scheduled to account for the first scheduling rule being prioritized over the second scheduling rule, and wherein the plurality of scheduling rules are configured to limit the update of the API calls to within respective rate limits of the plurality of APIs;
  based on the dynamic scheduling, issue update calls using a plurality of APIs respectively corresponding to the plurality of carriers to request shipment data for the shipments, such as to optimize use of computer and network resources;
  use a machine learning model to analyze and interpret the shipment data returned in response to the update API calls; and
  update the shipping records based on the shipment data that was analyzed and interpreted by the machine learning model.

11. The computer program product of claim 10, wherein the computer executable instructions are executable by the processor further to:
  access a selected shipping record representing a shipment by a carrier of the plurality of carriers;
  determine a last update time for the selected shipping record and a next scheduled update time for the selected shipping record;
  based on a determination that the last update time for the selected shipping record is after the next scheduled update time for the shipping record:
    match the selected shipping record to a carrier specific scheduling rule for the carrier; and
    update the next scheduled update time for the selected shipping record based on the carrier specific scheduling rule;
  based on a determination that a current time is after the next scheduled update time:
    create a task to update the shipping record;
    generate an API call to a carrier system of the carrier to request a status update for the shipping record; and
    update the selected shipping record based on shipment information returned in the response to the API call.

12. The computer program product of claim 11, wherein the computer executable instructions are executable by the processor further to connect to the carrier system on behalf of a user using carrier credentials associated with the user at a shipping management system.

13. The computer program product of claim 11, wherein the carrier specific scheduling rule specifies an update frequency based on a shipment status indicated in the selected shipping record.

14. The computer program product of claim 11, wherein the carrier specific scheduling rule specifies an update frequency based on an exception indicated in the selected shipping record.

15. The computer program product of claim 11, wherein the carrier specific scheduling rule specifies an update frequency based on an indication of interest indicated in the selected shipping record.

16. The computer program product of claim 11, wherein the last update time is a time associated with a last in time event recorded for the shipment by a shipping management system.

17. The computer program product of claim 10, wherein the computer executable instructions are executable by the processor further to:
- receive carrier-specific shipment records based on the update API calls;
- apply respective carrier-specific mapping rules from a set of carrier-specific mapping rules to the carrier-specific shipment records to map status codes or descriptions in the carrier-specific shipment records to generate normalized shipping information for shipments across the carriers, the normalized shipping information comprising normalized status codes; and
- update the shipping records with the normalized shipping information.

18. The computer program product of claim 17, wherein the computer executable instructions are executable by the processor further to receive carrier-specific shipment records from a particular carrier via a plurality of integration paths.

* * * * *